United States Patent
Dunbar et al.

(10) Patent No.: US 12,500,788 B2
(45) Date of Patent: *Dec. 16, 2025

(54) SDN FACILITATED MULTICAST IN DATA CENTER

(71) Applicant: Futurewei Technologies, Inc., Addison, TX (US)

(72) Inventors: Linda Dunbar, Plano, TX (US); Michael McBride, Laguna Niguel, CA (US)

(73) Assignee: Futurewei Technologies, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 17/870,743

(22) Filed: Jul. 21, 2022

(65) Prior Publication Data

US 2022/0376936 A1 Nov. 24, 2022

Related U.S. Application Data

(60) Continuation of application No. 17/209,005, filed on Mar. 22, 2021, now Pat. No. 11,398,921, which is a continuation of application No. 16/242,696, filed on Jan. 8, 2019, now Pat. No. 10,958,461, which is a division of application No. 13/904,230, filed on May 29, 2013, now Pat. No. 10,225,094.

(60) Provisional application No. 61/652,843, filed on May 29, 2012.

(51) Int. Cl.
*H04L 12/18* (2006.01)

(52) U.S. Cl.
CPC .................. *H04L 12/185* (2013.01)

(58) Field of Classification Search
CPC ..... H04L 12/46; H04L 12/4641; H04L 45/64; H04L 49/70; H04L 2212/00; H04L 45/74; H04L 12/185; H04L 49/201; H04L 12/18; H04L 69/22

See application file for complete search history.

(56) References Cited

U.S. PATENT DOCUMENTS

| | | | |
|---|---|---|---|
| 6,553,028 B1* | 4/2003 | Tang | H04L 45/02 370/389 |
| 10,511,548 B2* | 12/2019 | Liu | H04L 49/201 |
| 10,924,419 B1* | 2/2021 | Chitalia | H04L 47/2483 |
| 2002/0062344 A1* | 5/2002 | Ylonen | H04L 63/164 709/204 |
| 2002/0131414 A1* | 9/2002 | Hadzic | H04L 12/4616 370/393 |
| 2005/0076207 A1* | 4/2005 | Park | H04L 12/4633 713/163 |
| 2006/0018335 A1* | 1/2006 | Koch | H04L 12/18 370/432 |

(Continued)

*Primary Examiner* — Tonia L Dollinger
*Assistant Examiner* — Linh T. Nguyen

(57) ABSTRACT

A method implemented by a controller in a software defined network (SDN), the method comprising sending, to an overlay edge node, a query message comprising a client specific multicast address, receiving, from the overlay edge node, one or more report messages corresponding to the query message, wherein each of the one or more report messages comprises an address of each of one or more virtual machines (VMs) coupled to the overlay edge node, and updating membership of a multicast group, which is identified by the client specific multicast address, such that the one or more VMs are members in the updated membership of the multicast group.

16 Claims, 21 Drawing Sheets

(56) References Cited

U.S. PATENT DOCUMENTS

| | | | |
|---|---|---|---|
| 2008/0002727 A1* | 1/2008 | Yamane | H04L 12/1836 370/466 |
| 2009/0037607 A1* | 2/2009 | Farinacci | H04L 61/103 709/249 |
| 2012/0147890 A1* | 6/2012 | Kikuchi | H04L 12/4633 370/392 |
| 2013/0077629 A1* | 3/2013 | Wijnands | H04L 45/04 370/390 |
| 2013/0100851 A1* | 4/2013 | Bacthu | H04L 12/18 370/254 |
| 2013/0170490 A1* | 7/2013 | Kreeger | H04L 12/1877 370/390 |
| 2013/0250951 A1* | 9/2013 | Koganti | H04L 61/5007 370/392 |
| 2013/0318219 A1* | 11/2013 | Kancherla | H04L 12/4633 709/222 |
| 2013/0343385 A1* | 12/2013 | Benny | H04L 12/4633 370/392 |
| 2014/0112137 A1* | 4/2014 | Schlansker | H04L 12/4641 370/235 |
| 2015/0280928 A1* | 10/2015 | Tessmer | H04L 12/18 370/390 |
| 2015/0381484 A1* | 12/2015 | Hira | H04L 45/64 370/392 |
| 2016/0241491 A1* | 8/2016 | Tripathi | H04L 47/122 |
| 2018/0123951 A1* | 5/2018 | Wang | H04L 12/4633 |
| 2018/0367341 A1* | 12/2018 | Wallace | H04L 67/10 |
| 2019/0020490 A1* | 1/2019 | Boutros | H04L 12/185 |
| 2019/0215175 A1* | 7/2019 | Mathew | H04L 12/1886 |
| 2020/0382420 A1* | 12/2020 | Suryanarayana | H04L 12/4641 |
| 2021/0058295 A1* | 2/2021 | Pianigiani | H04L 41/082 |
| 2021/0216908 A1* | 7/2021 | Lu | G06N 5/01 |

* cited by examiner

720 →

| Outer DA | Outer SA | Virtual Network Instance ID | Inner DA | Inner SA | Local Virtual Network ID | Payload |
|---|---|---|---|---|---|---|
| Overlay Edge | Multicast controller address | VN-ID for the client | Broadcast address, generic multicast address, or client specific multicast address | Client specific multicast address | | ... |

| Inner Address ⇔ Outer Address mapping | | | |
|---|---|---|---|
| Outer Address | | Inner Address | |
| Multicast controller address | Virtual Network Instance ID | Client specific Multicast address | Local virtual network ID |

*FIG. 9*

| Outer DA | Outer SA | Virtual Network Instance ID | Inner DA | Inner SA | Local Virtual Network ID | Payload |
|---|---|---|---|---|---|---|
| Overlay edge address | Multicast controller address | VN-ID for the client | Generic Multicast 224.0.0.1 (MAC: 01005e010101) or Specific group 239.5.5.5 (MAC: 01005e050505) | Multicast controller pseudo inner address | | IGMP Query |

| Outer DA | Outer SA | Virtual Network Instance ID | Inner DA | Inner SA | Local Virtual Network ID | Payload |
|---|---|---|---|---|---|---|
| Multicast controller IP | Overlay edge address | VN-ID for the client | Multicast controller MAC | VM address | | IGMP Report |

| Outer DA | Outer SA | Virtual Network Instance ID | Inner DA | Inner SA | Local Virtual Network ID | Payload |
|---|---|---|---|---|---|---|
| Multicast Controller address | Overlay Edge to which the Multicast Router is attached | VN-ID for the client | Generic Multicast 224.0.0.1 (MAC: 01005e010101) or Specific group 239.5.5.5 (MAC: 01005e050505) | Multicast Router's MAC | | IGMP Query |

| Outer DA | Outer SA | Virtual Network Instance ID | Inner DA | Inner SA | Local Virtual Network ID | Payload |
|---|---|---|---|---|---|---|
| Overlay Edge to which the Multicast Router is attached | Overlay Edge to which VMs are attached. | VN-ID for the client | Multicast router's MAC | VM address | | IGMP Report |

SDN FACILITATED MULTICAST IN DATA CENTER

CROSS-REFERENCE TO RELATED APPLICATIONS

This application is a continuation application of U.S. patent application Ser. No. 17/209,005, filed on Mar. 22, 2021, which is a continuation of U.S. patent application Ser. No. 16/242,696, which is divisional application of U.S. patent application Ser. No. 13/904,230, filed on May 29, 2013, which claims priority to U.S. Provisional Patent Application No. 61/652,843 filed May 29, 2012 by Linda Dunbar et al. and entitled "SDN Facilitated Multicast in Data Center", all of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Virtual and overlay network technology has significantly improved the implementation of communication and data networks in terms of efficiency, cost, and processing power. In a software defined network (SDN) architecture, an overlay network may be built on top of an underlay network. Nodes within the overlay network may be connected via virtual and/or logical links that may correspond to nodes and physical links in the underlay network. The overlay network may be partitioned into virtual network instances (e.g. Internet Protocol (IP) subnets) that may simultaneously execute different applications and services using the underlay network. Further, virtual resources, such as computational, storage, and/or network elements may be flexibly redistributed or moved throughout the overlay network. For instance, hosts and virtual machines (VMs) within a data center may migrate to any server with available resources to run applications and provide services. As a result, virtual and overlay network technology has been central to improving today's communication and data network by reducing network overhead while improving network throughput.

In an overlay network, multicast may sometimes be preferred over unicast, since multicast may achieve delivery of a data frame comprising a multicast address to a group of destination nodes simultaneously in a single transmission from the source. Copies of the data frame may be automatically replicated in intermediate network nodes (e.g., routers), when the topology of the overlay network so requires it. In an overlay network, e.g., of a data center, there may potentially be many multicast groups each with a multicast address. Existing multicast solutions may require intermediate nodes to maintain state for each multicast address. This may create unnecessary processing burden for some hypervisors implemented on servers, especially when there is only a small portion of hypervisors that actually need to process multicast data frames.

SUMMARY

In one embodiment, the disclosure includes a method implemented by a controller in a software defined network (SDN), the method comprising sending, to an overlay edge node, a query message comprising a client specific multicast address, receiving, from the overlay edge node, one or more report messages corresponding to the query message, wherein each of the one or more report messages comprises an address of each of one or more virtual machines (VMs) coupled to the overlay edge node, and updating membership of a multicast group, which is identified by the client specific multicast address, such that the one or more VMs are members in the updated membership of the multicast group.

In another embodiment, the disclosure includes an apparatus configured to couple to a second apparatus that is designated for forwarding multicast data frames in a data center (DC), the apparatus comprising at least one transceiver configured to transmit, to an overlay edge node, a query message comprising a multicast address of a multicast group, and receive, from the overlay edge node, one or more report messages corresponding to the query message, wherein each of the one or more report messages comprises an address of each of one or more VMs coupled to the overlay edge node, and a processor coupled to the transceiver and configured to update membership of the multicast group such that the one or more VMs are members in the updated membership of the multicast group.

In yet another embodiment, the disclosure includes a method used by a replication point (RP) in a DC, the method comprising receiving membership information of a multicast group from a controller in the DC, and forwarding, based on the membership information, a multicast data frame from a first overlay edge node to a second overlay edge node.

In yet another embodiment, the disclosure includes a computer program product comprising computer executable instructions stored on a non-transitory computer readable medium such that when executed by a processor cause an overlay edge node to receive, from a multicast controller of a data center network, a gratuitous message comprising a network address as an outer source address (SA) and a multicast address as an inner SA, learn mapping between the network address and the multicast address by interpreting the gratuitous message, receive, from a host coupled to the overlay edge node, a multicast data frame comprising the multicast address, based on the learned mapping, encapsulate the multicast data frame to generate an encapsulated data frame comprising the network address as an outer destination address (DA), and forward the encapsulated data frame to a network node identified by the network address.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 8 illustrates an embodiment of a gratuitous message.

FIG. 9 illustrates an embodiment of a mapping relationship between the inner addresses and outer addresses in a gratuitous message.

FIG. 12 illustrates an embodiment of an internet group management protocol (IGMP) query.

FIG. 13 illustrates an embodiment of an IGMP report.

FIG. 17 illustrates an embodiment of another IGMP query.

FIG. 18 illustrates an embodiment of another IGMP report.

DETAILED DESCRIPTION

Figure 1:
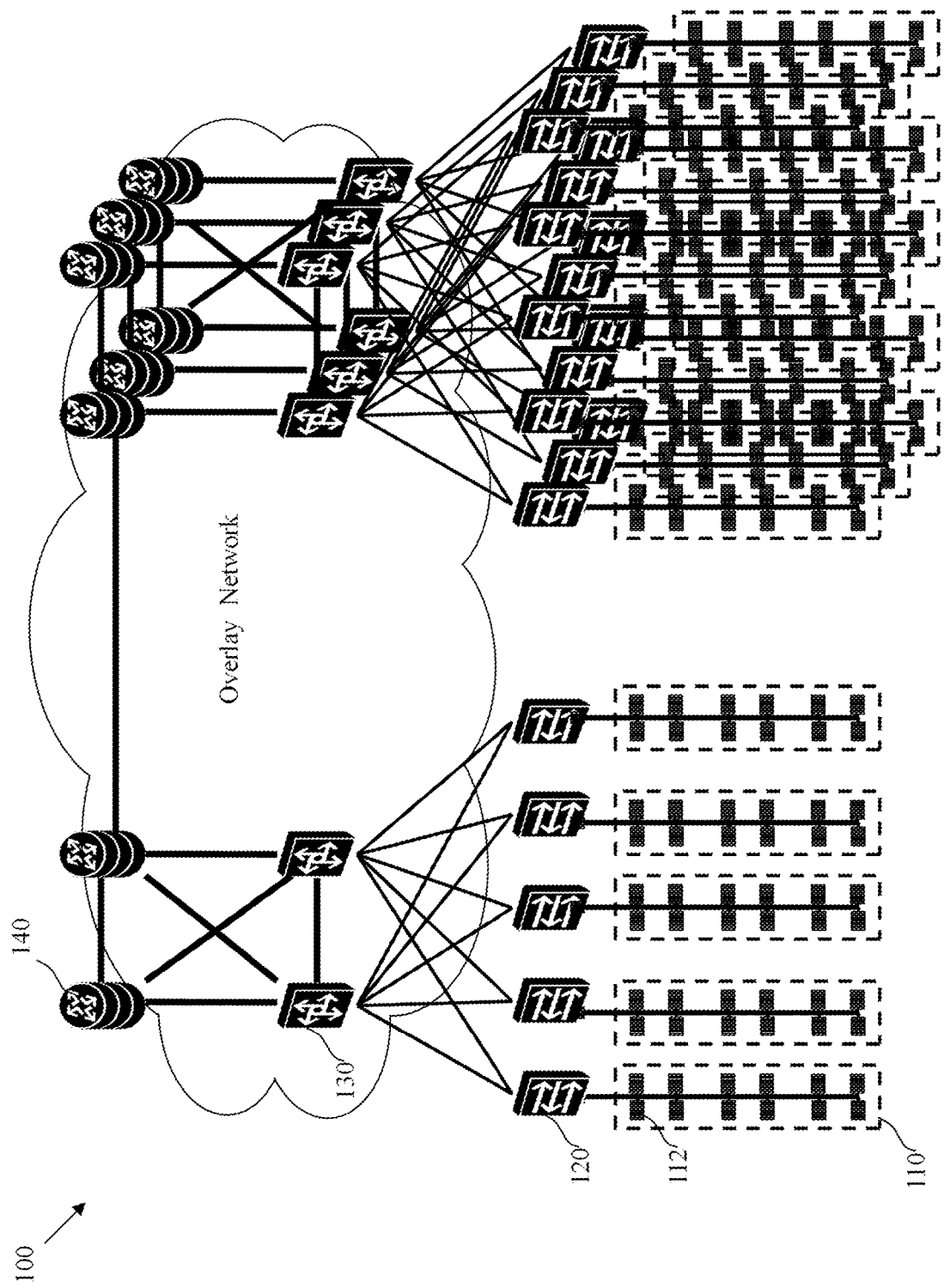
FIG. 1 illustrates an embodiment of a data center (DC) network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an overlay network, an overlay edge node may comprise a hypervisor managing a plurality of VMs. The hypervisor may have a virtual switch (vSwitch) configured to facilitate communication among the VMs on the hypervisor, and/or between a VM on the hypervisor and an outside VM. Since there may be many VMs coupled to one vSwitch, when sending a multicast data frame from a VM to other network nodes, the vSwitch may encapsulate the multicast frame to hide VM information from intermediate nodes. However, the intermediate nodes between the source and receiver may need individual VM addresses to properly process the multicast frame.

Also, for a vSwitch to process multicast data frames, different types of scenarios may require different actions or decisions. For example, the vSwitch may or may not need to do head-end replication, which replicates a multicast data frame to create multiple unicast data frames. If the vSwitch does head-end replication, the vSwitch may need to maintain the state information of all active receivers that are members of multicast groups. The state maintenance may become complex, when there are many multicast groups with members attached to the vSwitch. On the other hand, if the vSwitch does not implement head-end replication, vSwitch may send multicast data frames to a common multicast tree in the overlay Network. Since there may be receivers attached to the vSwitch, the multicast frames may come back to the sender (i.e., the source VM), which is undesired.

Upon receiving a multicast data frame, a vSwitch may need to have the intelligence to determine which VMs should or should not receive the multicast data frame. Additionally, only a small percentage of servers deployed may have directly attached VMs participating in any multicast group. Therefore, equipping vSwitches with the intelligence to deal with multicast functions may not always be cost effective. Further, without hardware or software upgrade, the existing network equipment in the core or underlay network may not snoop IGMP reports sent from VMs, because the SA and destination address (DA) in the outer header of data frames may be addresses of the overlay edge node instead of addresses of VMs. Further, when there are a large number (e.g., millions) of VMs, existing solutions may encounter scalability problems.

An overlay network in a data center may be similar in some way to a multi-protocol label switching (MPLS) virtual private network (VPN) in a service provider network. For example, provider edge (PE) nodes in a VPN may be similar to overlay edge nodes in a DC overlay network. However, multicast solutions designed for the VPN may not necessarily fit for a DC overlay network due to various differences between the two types of networks. For example, client attachment to VPN PEs may be somewhat static and do not change often. On the contrary, a DC environment may allow VMs to migrate among servers or overlay edge nodes. Thus the VM attachment to overlay edge nodes may change frequently. For another example, the number of PEs to which one VPN client is attached may normally be less than the number of overlay edge nodes to which a client's VMs may be attached. For yet another example, when a client has multiple multicast groups in a VPN, all multicast groups of this client may be combined as one multicast group in the VPN core. As a result, all messages from any multicast group belonging to the client may reach all PE nodes of the client. The amount of bandwidth wasted for the core may not be significant because of the relatively small number of PE nodes for each VPN client. But in a DC environment, a client may have relatively more overlay edge nodes, each of which may support a high number of VMs. Consequently, the VPN multicast approach may not scale well in the DC context, as significant bandwidth may be wasted.

Disclosed herein are apparatuses, systems, and methods for simplified and improved multicasting in an overlay network of a DC. This disclosure provides mechanisms on how the overlay network may facilitate and enable communication of multicast data frames in a data center network, which may have deployed vSwitches and/or low cost top of rack (ToR) switches that do not support multicast functions. In other words, this disclosure may ensure proper processing and delivery of multicast data frames in an overlay network, without requiring any overlay edge node to support multicast function or requiring any changes to existing switches or routers in the core network. In an embodiment, a centralized controller (referred to hereafter as a DC-SDN controller) may be configured to manage membership information of all multicast groups present in the DC. The DC-SDN controller may use a multicast controller (may be a module in the DC-SDN controller) to send out gratuitous messages to allow address mapping by overlay edge nodes. Further, upon any VM change or migration, the multicast controller may be responsible of updating multicast group memberships by using query messages and report messages. Provided with membership information from the DC-SDN controller, designated replication points (RPs) may be enabled to facilitate data forwarding to receiving overlay edge nodes, regardless of whether the receiving overlay edge nodes are capable of multicast functions.

FIG. 1 illustrates an embodiment of a data center (DC) network 100, in which disclosed multicast schemes may be implemented. The DC network 100 may use a rack-based architecture, in which multiple equipment or machines (e.g., servers) may be arranged into rack units. For illustrative purposes, one of the racks is shown as rack 110, and one of the machines is shown as a server 112 mounted on the rack 110, as shown in FIG. 1. There may be top of rack (ToR) switches located on racks, e.g., with a ToR switch 120 located on the rack 110. There may also be end of row switches or aggregation switches, such as an aggregation switch 130, each interconnected to multiple ToR switches and routers. A plurality of routers may be used to interconnect other routers and switches. For example, a router 140 may be coupled to other routers and switches including the switch 130. In addition, there may be core switches and/or routers configured to interconnect the DC network 100 with the gateway of another DC or with the Internet. The DC network 100 may implement an overlay network and may comprise a large number of racks, servers, switches, and routers. Since each server may host a larger number of applications running on VMs, the network 100 may become fairly complex.

Figure 2:
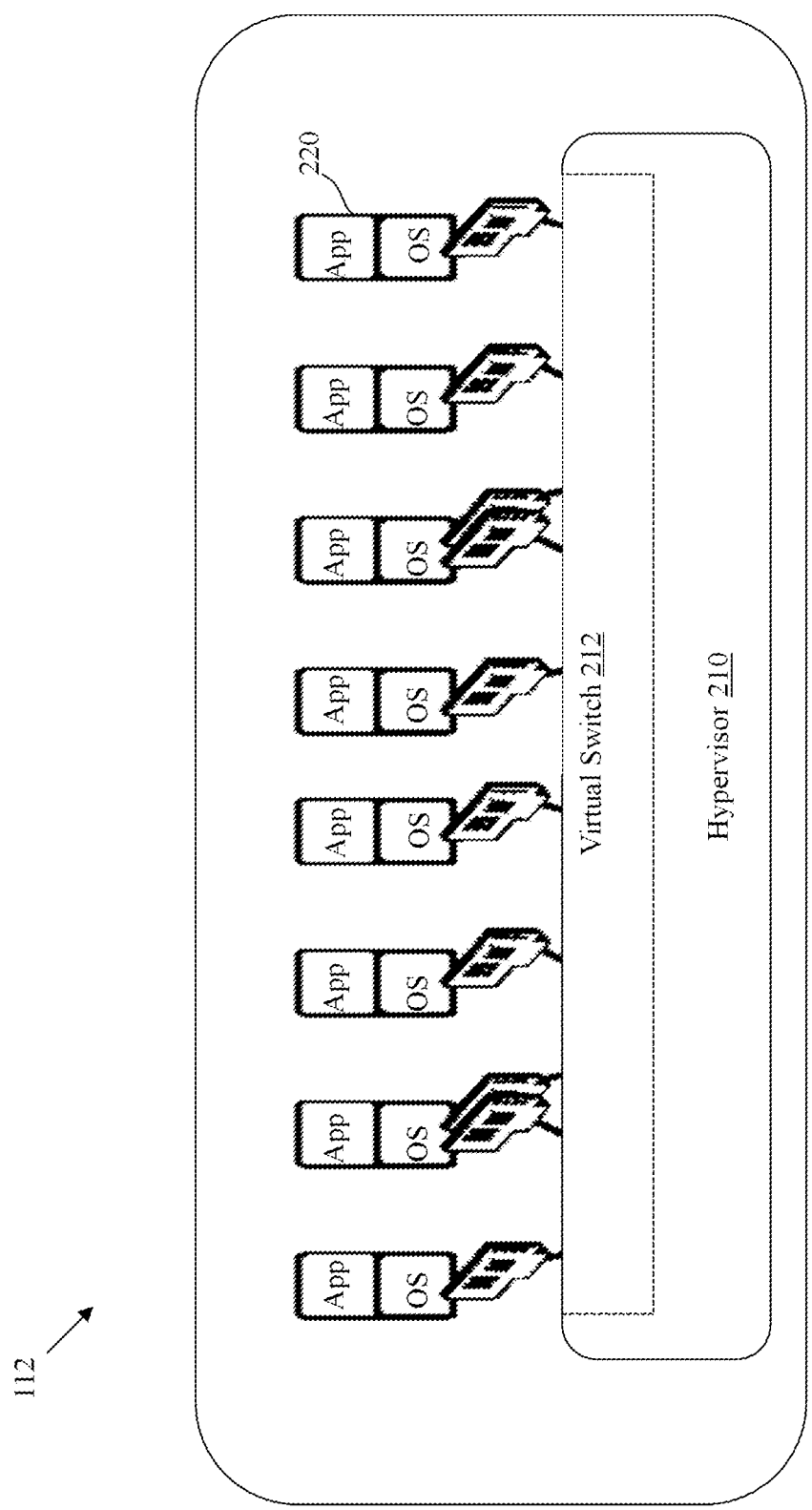
FIG. 2 illustrates an embodiment of a server.

Servers in the DC network 100 may host multiple VMs. To facilitate communications among multiple VMs hosted by one physical server (e.g., the server 112), one or more hypervisors may be set up on the server 112. Refer now to FIG. 2, which illustrates an embodiment of the server 112 comprising a hypervisor 210 and a plurality of VMs 220 (one numbered as 220 in FIG. 2) coupled to the hypervisor 210. The hypervisor 210 may be configured to manage the VMs 220, each of which may implement at least one application (denoted as App) running on an operating system (OS). In an embodiment, the hypervisor 210 may comprise a virtual switch (denoted hereafter as vSwitch) 212. The vSwitch 212 may be coupled to the VMs 220 via ports and may provide basic switching function to allow communications among any two of the VMs 220 without exiting the server 112.

Further, to facilitate communications between a VM 220 and an entity outside the server 112, the hypervisor 210 may provide encapsulation function or protocol, such as virtual extensible local area network (VXLAN) and network virtualization over generic routing encapsulation (NVGRE). When forwarding a data frame from a VM 220 to another network node, the hypervisor 210 may encapsulate the data frame by adding an outer header to the data frame. The outer header may comprise an address (e.g., an IP address) of the server 112, and addresses of the VM 220 may be contained only in an inner header of the data frame. Thus, the addresses of the VM 220 may be hidden from the other network node (e.g., router, switch). Similarly, when forwarding a data from another network to a VM 220, the hypervisor 210 may decapsualte the data frame by removing the outer header and keeping only the inner header.

Figure 3:
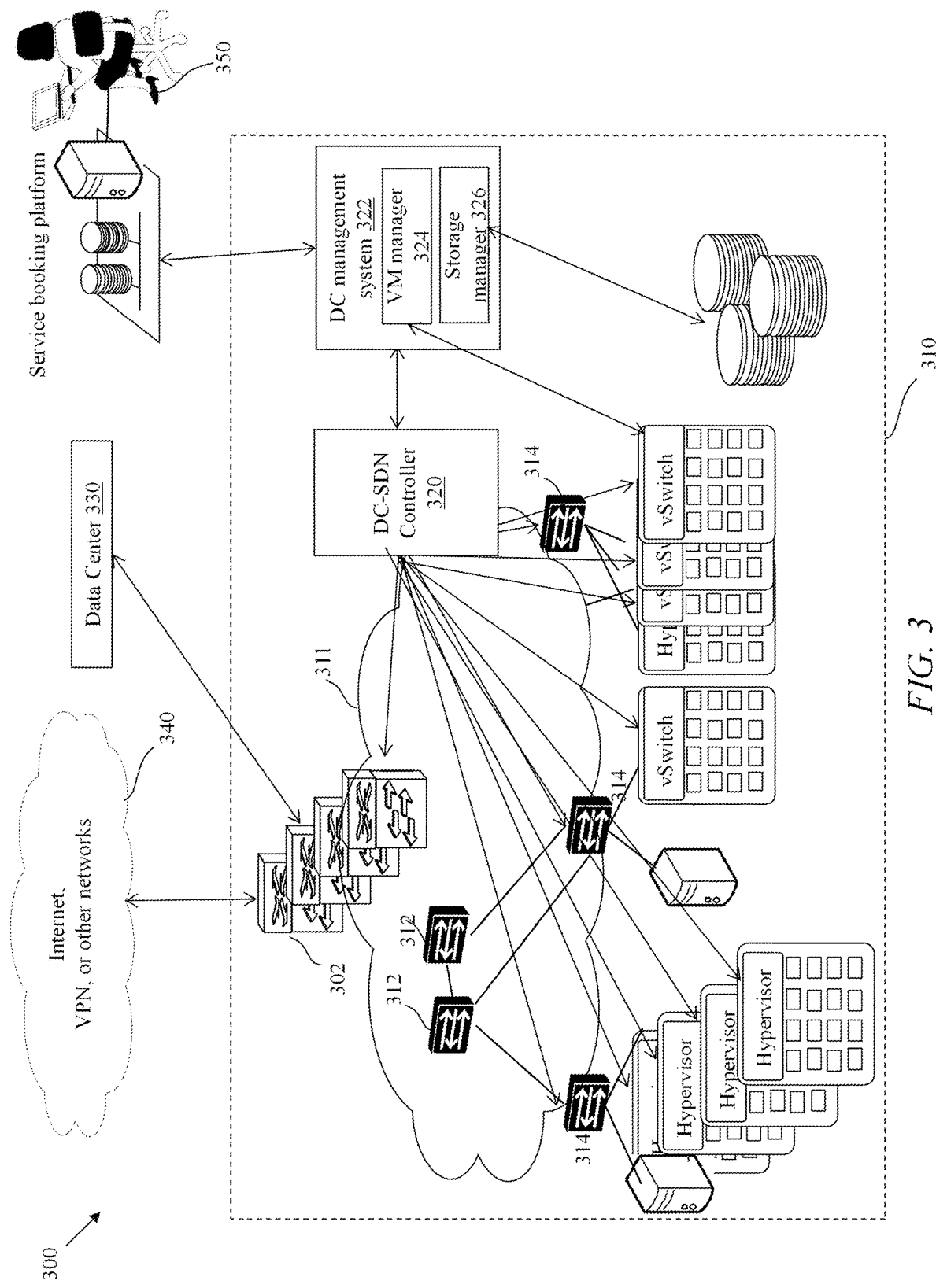
FIG. 3 illustrates an embodiment of a system architecture.

FIG. 3 illustrates an embodiment of a system architecture 300, which may comprise a DC 310 and other networks interconnected with the DC 310. As shown in FIG. 3, the DC 310 may be interconnected via gateway routers or switches 302 to one or more additional DCs (e.g., DC 330) and one or more networks (e.g., network 340). The network 340 may be any type of network, such as the Internet, a VPN, etc. Clients (e.g., client 350) may obtain services from the DC 310 through a service booking platform, which may be implemented, e.g., as a web platform.

The DC 310 may be similar to the DC shown in FIG. 1 but illustrated in FIG. 3 from a different perspective. The DC 310 may implement an overlay network 311, which may comprise a plurality of inside or core nodes 312 and a plurality of boundary or edge nodes 314, each coupled to one or more other nodes via links. In an overlay network, the edge nodes are also referred to as overlay edge nodes or network virtualization edge nodes (in short as NVEs). An edge node described herein may be any suitable type of switch (e.g., a vSwitch, a ToR switch, an end of row switch, or an aggregation switch), hypervisor, server, etc. Note that the gateway routers or switches 302 are examples of edge nodes. As shown in FIG. 3, an edge node 314 may comprise one or more vSwitches and/or hypervisors (some hypervisors may not have integrated vSwitch so they are coupled to ToR switches). The edge nodes 314 may perform encapsulation for data frames so that the core nodes 312 and links between nodes may not see the addresses of nodes outside the edge nodes (outside the DC 310). For example, an edge node 314 may add an outer header to data frames from hosts (e.g., applications running on VMs) outside the core network, so that the other nodes (312 or 314) may see only the outer header of the data frames.

This disclosure describes a mechanism to ensure proper multicast processing and multicast data frames delivery in the DC overlay network without requiring the edge nodes 314 to support any multicast function or making any changes to existing switches/routers in the core or underlay network. In an embodiment, a controller 320 may be used to manage and control multicast groups' membership and proper multicast data frames delivery, as shown in FIG. 3. Since the overlay network in the DC 310 may be a SDN, the controller 320 may also be referred to hereafter as a DC-SDN controller. The controller 320 may be an off-line controller coupled to a DC management system 322, which may also be referred to as a system control and configuration manager. The management system 322 may comprise a VM manager 324 and a storage manager 326 coupled to the VM manager 324. The VM manager 324 may be configured to manage all VMs present in the DC 310. For example, the VM manager 324 may have information regarding which VM is located on which server or coupled to which vSwitch. Any adding/moving/removing operation of a VM from/to an edge node may be known by the VM manager 324. The controller 320 may be implemented as a standalone device, or alternatively as part of the management system 322.

In the system architecture 300, each client virtual network may have one or more multicast groups, and each multicast group may have its own multicast address or addresses. A multicast address may be a Layer 2 (e.g., Ethernet or MAC) address or a Layer 3 (e.g., IP) address.

Figure 4:
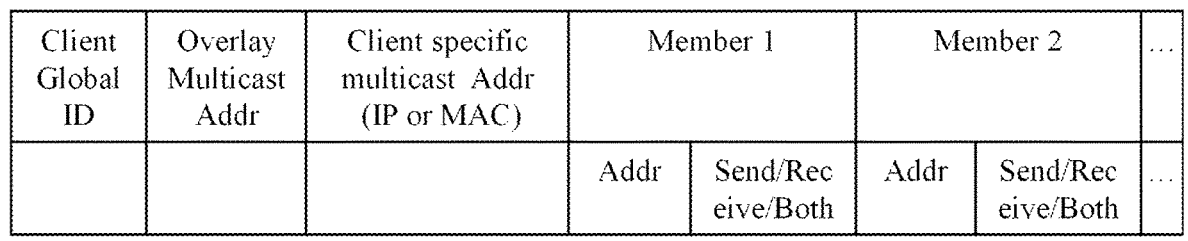
FIG. 4 illustrates an exemplary data structure comprising membership information of multicast groups.

In an embodiment, the controller 320 may maintain the membership information of all multicast groups for all clients' virtual networks in the DC 310. FIG. 4 illustrates an exemplary data structure 400 comprising membership information of multicast groups. As shown in FIG. 4, the membership information for a particular multicast group may comprise a client global identifier (ID), an overlay multicast address (sometimes denoted as Addr), a client specific multicast address (IP or MAC), and the addresses and capability of all members of the multicast group. Each member address may be a IP or MAC address, and the capability of each member may be send only, receive only, or both. The overlay multicast may be set to null, or may correspond to multiple client specific multicast addresses (e.g., if a client has multiple multicast groups each with a different client specific multicast address).

Figure 5A:
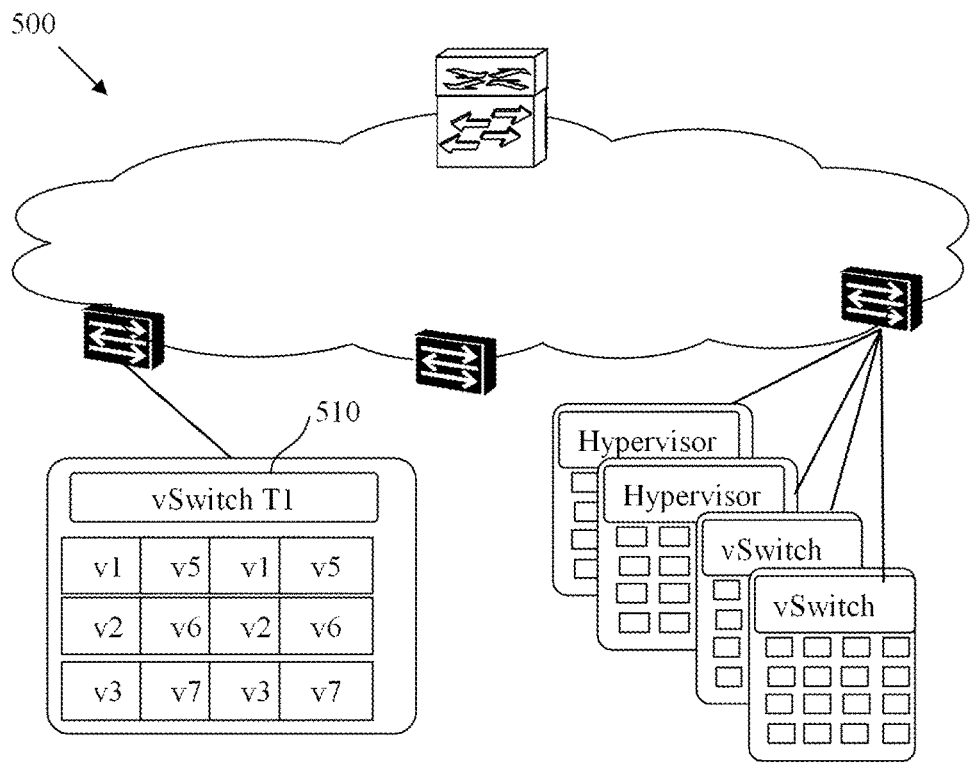
FIGS. 5A-5C illustrate exemplary scenarios of relationships between VMs and virtual switches.
Figure 5B:
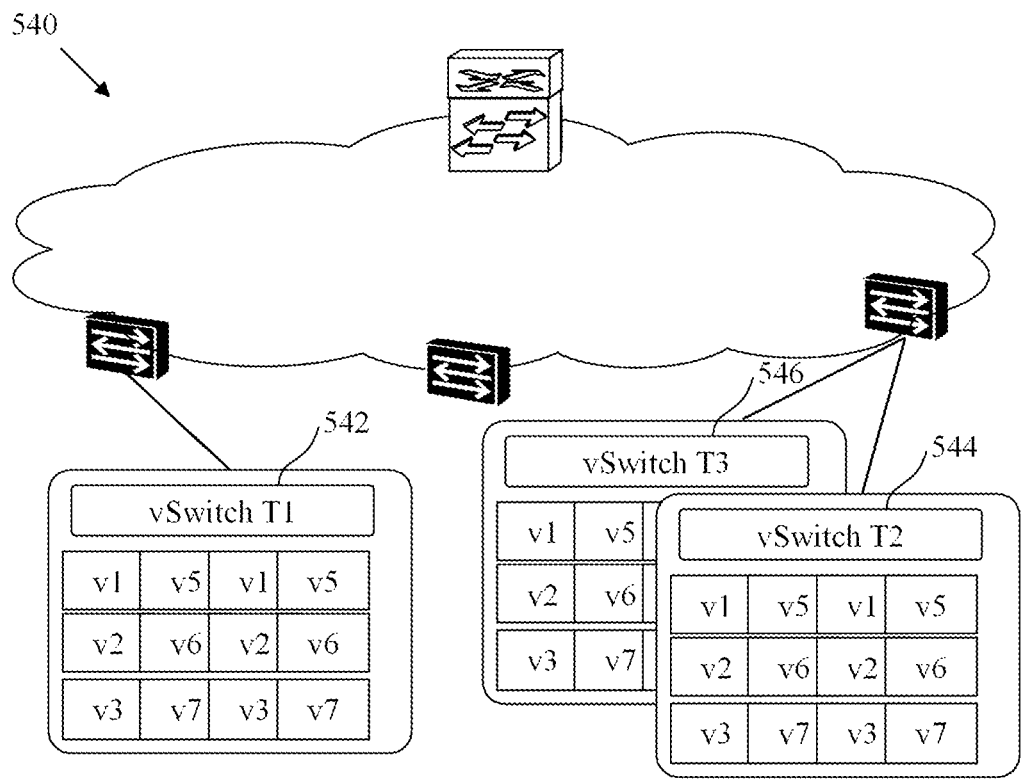
Figure 5C:
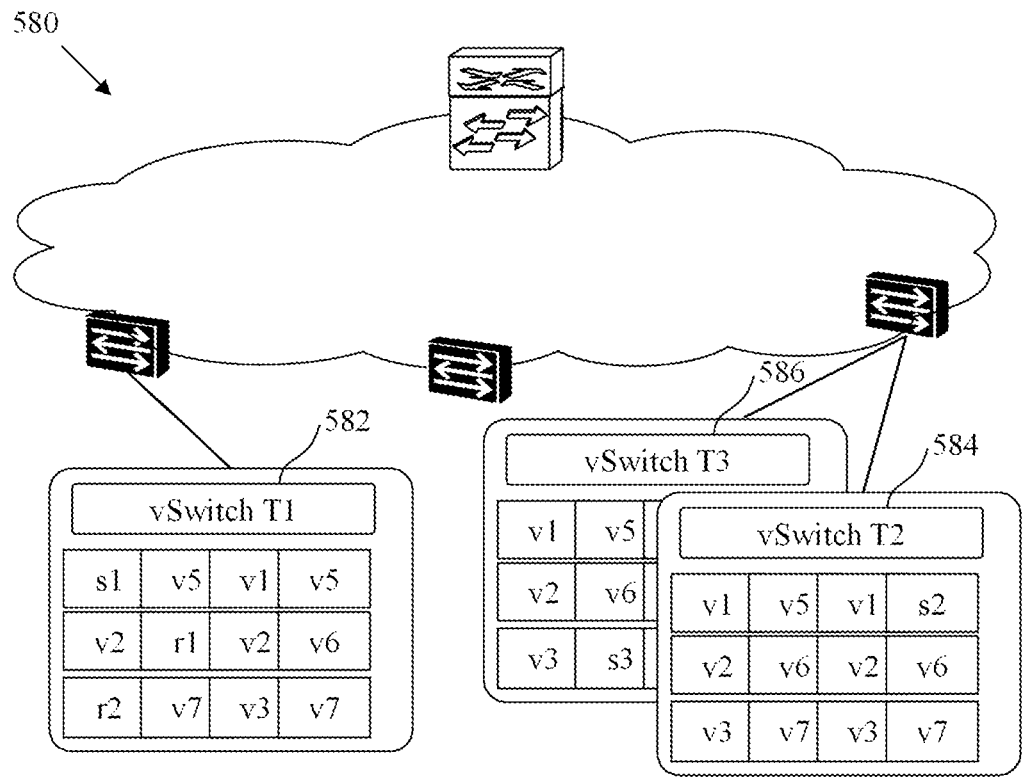

As VMs in a DC may move or migrate from one server to another, the VMs may become members of different multicast groups at different times. FIGS. 5A-5C illustrate exemplary scenarios of relationships between VMs and virtual switches. FIG. 5A illustrates scenario 500, in which all members of a multicast group are attached or coupled to one vSwitch 510. Note that the members are VMs denoted as v1-v7. FIG. 5B illustrates scenario 540, in which some members of a multicast group are coupled to one vSwitch 542, while some other members of the same multicast group are coupled to one or more other vSwitches, such as vSwitches 544 and 546. FIG. 5C illustrates scenario 580, in which some members of a multicast group are only capable of receiving data frames from or sending data frame to certain other members. For example, VMs, denoted as r1 and r2, coupled to vSwitch 582 may only be capable of receiving data frames, and only receiving from VM denoted as s2 (coupled to vSwitch 584) but not from VM denoted as s1 (coupled to vSwitch 582) or VM denoted as s3 (coupled to vSwitch 586). In a DC supporting multiple multicast groups, combinations of the scenarios 500, 540, and 580 may also exist. Due to the variety of scenarios that can occur, it may be advantageous for the DC-SDN controller rather than vSwitches to manage membership information of multicast groups.

Figure 6:
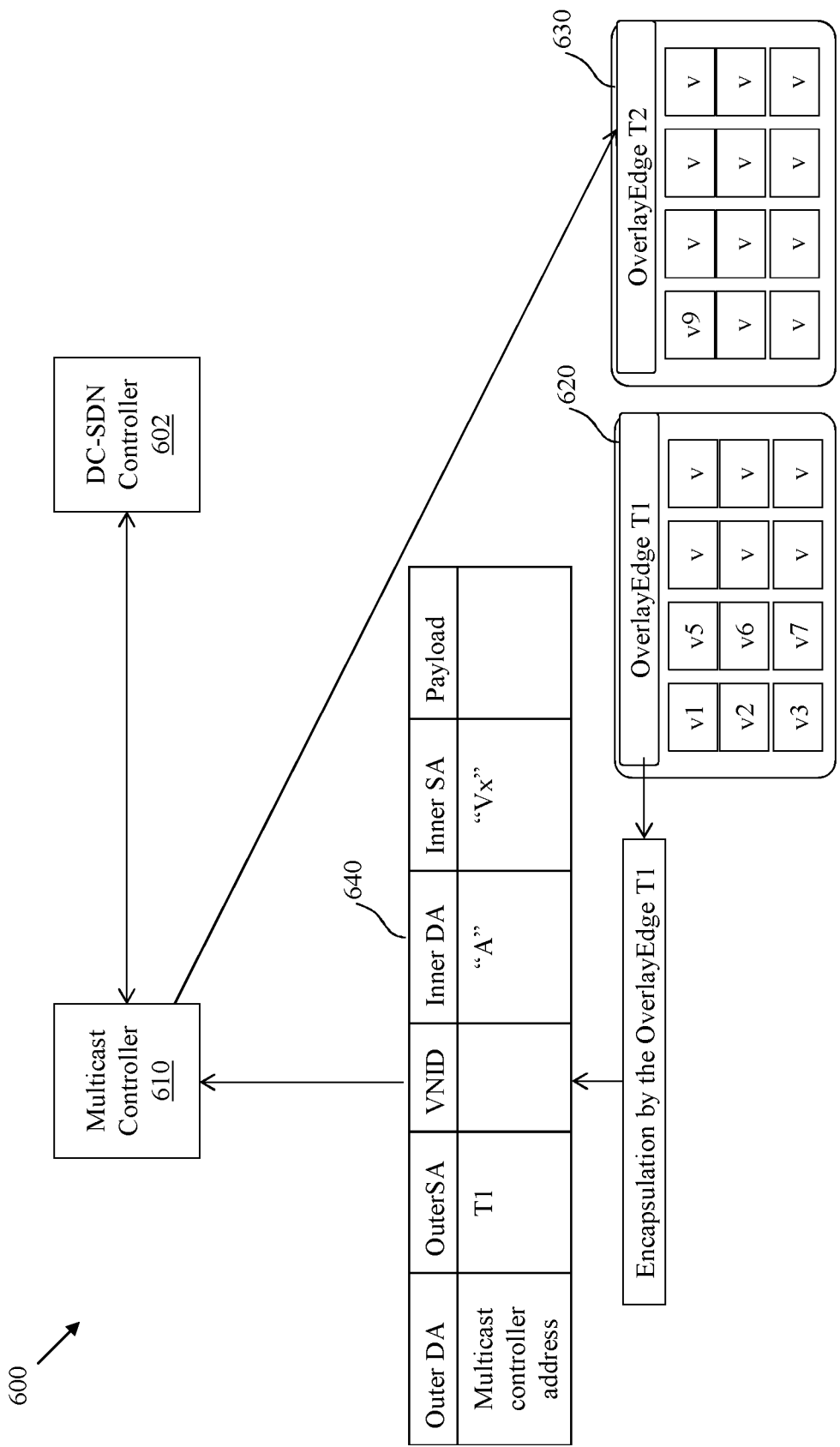
FIG. 6 illustrates an exemplary operation of a multicast protocol.

FIG. 6 illustrates an exemplary operation of a multicast protocol 600, which serves as an example of how multicast may be handled in a DC (such as the DC 310) in a given scenario. Note that some aspects of FIG. 6 may be the same with or similar to schemes or systems described previously, as a person of ordinary skill in the art will recognize. Thus, in the interest of conciseness, the following descriptions focus mainly on aspects not yet covered (same principle applies to other figures as well). The protocol 600 supposes that a multicast group has a virtual network ID (e.g., "Blue") and a multicast address (e.g., "A"). As shown in FIG. 6, the multicast group comprises members coupled to two overlay edge nodes including 620 (T1) and 630 (T2). Specifically, among group members, VMs denoted as v1, v2, v3, v5, v6, and v7 are coupled to the overlay edge node 620, while a VM denoted as v9 is coupled to the overlay edge node 630. Further, it is assumed that only v1 and v2 can send out data frames, and that v3, v5, v6, and v7 can only receive but not send data frames. It can be seen that these assumptions fit as a combination of scenarios 540 and 580.

It is possible that some overlay edge nodes in a DC support multicast, while other edge nodes in the DC support only unicast. As some overlay edge nodes may not do anything special for multicast data frames, all decisions regarding how and where to deliver multicast data frames may be made by a multicast controller 610. Specifically, overlay edge nodes may not differentiate whether received data frames are multicast or unicast frames, and may simply process multicast data frames in the same way they process unicast data frames.

The protocol 600 uses the multicast controller 610 as the decision maker. The multicast controller 610 represents a logical entity, and may be implemented as a module or component embedded in the DC-SDN controller 602. Alternatively, the multicast controller 610 may also be implemented in an aggregation or core switch or as a standalone device. Further, there may be multiple multicast controllers in a DC, with each multicast controller managing multicasting for a subnet of clients' virtual networks. Each multicast controller may be used for one or more clients of the DC.

As shown in FIG. 6, a multicast data frame may be sent from a member of the multicast group "Blue" to the multicast controller 610, which may act as a replication point that forwards the multicast data frame to other members of the multicast group "Blue". For example, the multicast data frame may be sent from v1 or v2 coupled to the overlay edge node 620 to the multicast address "A". The overlay edge node 620 may encapsulate the data frame from v1 or v2 by adding outer headers to the data frame. After encapsulation, a data frame 640 may comprise an address of the multicast controller 610 as an outer DA, an address of the overlay edge node 620 (denoted as T1) as an inner SA, a virtual network instance ID, the multicast address "A" as an inner DA, and the source member (v1 or v2, denoted as Vx) as an inner SA, and a payload.

The data frame 640 may be received by the multicast controller 610 and then forwarded to members of the multicast group "Blue". The DC-SDN controller 602 may pass membership information of the multicast group "Blue" to the multicast controller 610 to allow proper forwarding. Membership information passed by the DC-SDN controller 602 may comprise a virtual network ID ("Blue" in this case); a multicast address ("A"), {(member address, corresponding overlay Edge node ID), send and/or receiving capability} for each member. In an embodiment, information included in the data structure 400 in FIG. 4 may be passed.

Note that when v1 sends the data frame 640, any of v1, v2, v3, v5, v6, and v7 may receive the data frame 640, but v1 cannot receive the data frame 640. In other words, the data frame cannot be sent back to the sender or source. Further, recall that only v1 and v2 are capable of sending out data frames, thus the multicast controller 610 may drop all packets from the overlay edge node 620 that have an inner SA with the value of v3, v5, v6, or v7.

After receiving the data frame 640, the multicast controller 610 may forward the data frame 640 using various options. As a first option, the multicast controller 610 may replicate the data frame 640 with unicast addresses (e.g., set the inner DA as an address of v9 instead of the multicast address "A"). This may provide the advantage for simple processing on an egress overlay edge. However, if multiple receivers are attached to an overlay edge node, multiple unicast frames need to be sent to the overlay edge node over an overlay network, which may consume extra bandwidth. The first option may be used as a default option and may be useful for virtual switches on hypervisors or low cost switches that do not support any multicast functions.

As a second option, the multicast controller 610 may replicate the data frame 640 still with the multicast address "A" as its inner DA. The second option may provide an advantage that only one copy of the data frame 640 needs to be sent to a receiving overlay edge node, even when the receiving overlay edge has multiple receivers for the data frame 640. However, to use the second option, the receiving overlay edge node (e.g., node 630) may need capability or intelligence to avoid sending the data frame 640 back to the sender (e.g., v1). This processing may not be trivial, since traditional MAC learning may not work to obtain this intelligence, because a data plane path is via a fast-path as compared to a slow-path. Further, to support the second option, the multicast controller 610 may need to be notified of the multicast support by the receiving overlay edge node(s), either by configurations or messages from the receiving overlay edge nodes.

It is known that, for unicast data frames, overlay edge nodes may learn the mapping between corresponding inner address (e.g., an overlay edge node address) and outer address (e.g., VMs addresses directly attached to the overlay edge node) by observing the data frames traversed. The mapping method may be similar to methods used by transparent interconnection of lots of links (TRILL) and MAC-in-MAC (IEEE 802.1ah standard). In an embodiment, overlay edge nodes may learn the proper inner-outer addresses mapping for multicast data frames in the same or similar way as they do for unicast data frames, without any extra processing.

An application, which may be running on a physical server or on a VM, may use fixed mapping from IP multicast addresses to MAC multicast addresses. Thus, there may be no address resolution protocol (ARP) or neighbor discovery (ND) process to map IP multicast addresses to their corresponding MAC multicast addresses. Note that a multicast address may be put into a SA field of a data frame. Consequently, overlay edge nodes normally may not have any chance to learn the inner-outer addresses mapping from multicast data frames in an overlay network in the same way as they learn from unicast data frames.

Figure 7:
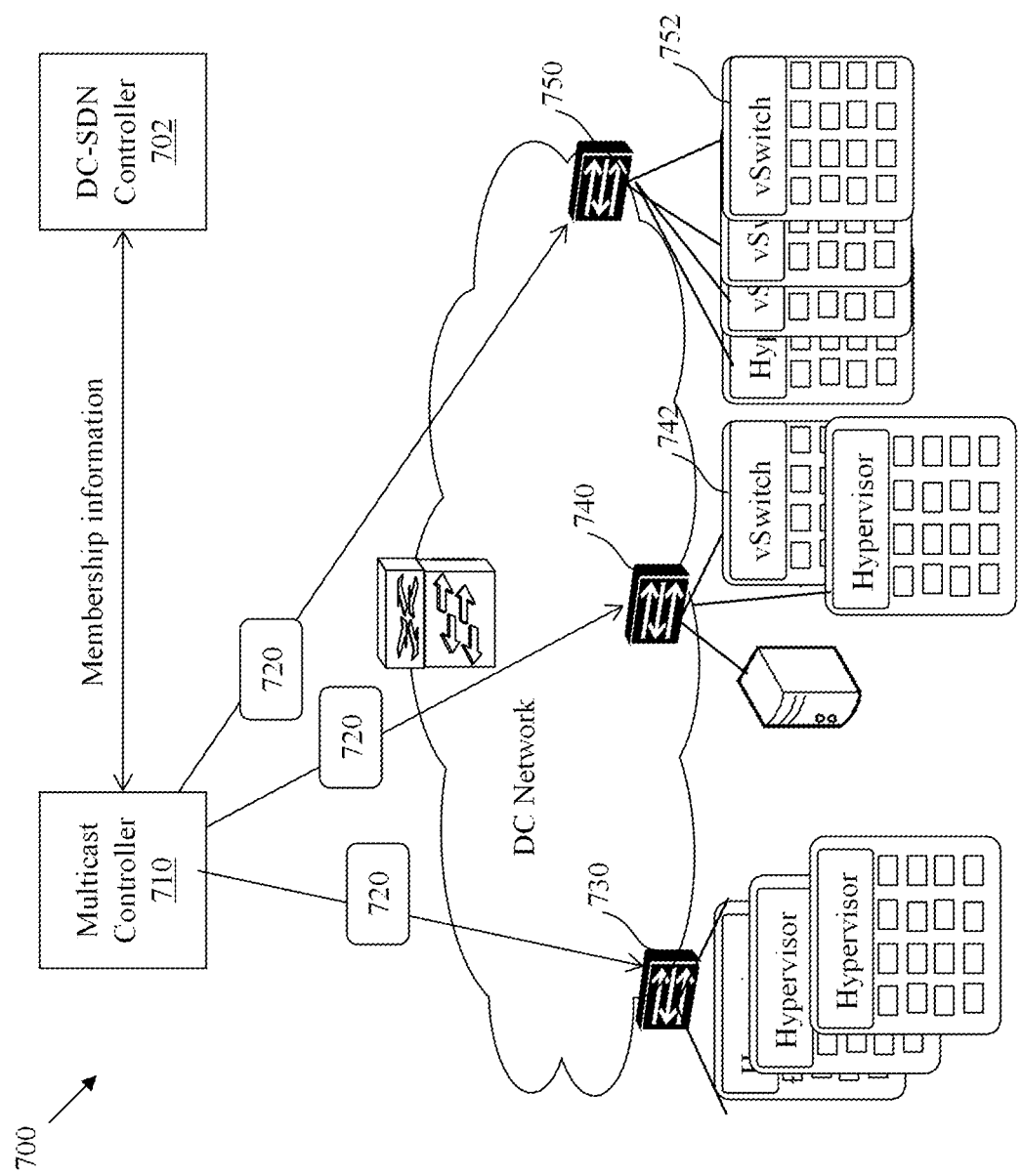
FIG. 7 illustrates an embodiment of a mapping mechanism.

FIG. 7 illustrates an embodiment of a mapping mechanism 700, which may allow overlay edge nodes to learn proper inner-outer addresses mapping for multicast addresses in the same or similar way as unicast addresses. Specifically, as the DC-SDN controller 702 manages the attributes for all multicast groups, the DC-SDN controller 702 may send, to a multicast controller 710, membership information of all multicast groups, such as information contained in the data structure 400 in FIG. 4. Equipped with group information, the multicast controller 710 may be configured to send out "fake" gratuitous messages 720 in a similar fashion as gratuitous ARP (IP version 4) or ND (IP version 6) messages. The term "gratuitous" here means that a gratuitous message 720 may not normally be needed but can be used in some cases. Also, the gratuitous messages 720 are referred to herein as fake gratuitous messages because, in the context of a conventional DC, the multicast controller 710 is not supposed to send out gratuitous messages. Rather, the gratuitous messages should be sent out by a replication point or a designated multicast service router (in short as designated multicast router or multicast router). As shown in FIG. 7, the gratuitous messages 720 may be sent to overlay edge nodes 730, 740, and 750.

FIG. 8 illustrates an embodiment of the gratuitous message 720, which may comprise an outer DA, an outer SA, a virtual network instance ID, an inner DA, an inner SA, a local virtual network ID, and a query payload. In the outer section of the gratuitous message 720, the outer DA may be the address of an overlay edge node (e.g., the overlay edge node 730), the outer SA may be the address of the multicast controller 710, and the virtual network instance ID may be an ID allowing a client to be globally identified in a DC. In the inner section of the gratuitous message 720, the inner DA may be a broadcast address, a generic multicast address, or a client specific multicast address. Further, the inner SA may be a client specific multicast address. Note that as the gratuitous message 720 is a "fake" gratuitous message, the inner SA is not the address of the actual message sender (in this case the multicast controller 710).

Referring back to FIG. 7, the overlay edge nodes 730-750 may receive the gratuitous messages 720 and thereafter decapsulate the outer header to learn the mapping between inner addresses and outer addresses. A decapsulated gratuitous message may be sent by an overlay edge node to all attached VMs. The decapsulated gratuitous message may be a gratuitous ARP or ND message, or may be a dummy data frame which may be ignored by the VMs. In addition, a decapsulated gratuitous message may also allow switches along the way from an overlay edge node to a VM to learn the path towards the multicast controller 710. This may be useful when there are one or more intermediate switches between an overlay boundary node and its VMs (e.g., a vSwitch 742 is between the overlay edge node 740 and its corresponding VMs).

Recall that the mapping between outer and inner addresses may be similar to mapping performed on unicast messages. FIG. 9 illustrates an embodiment of a mapping relationship 900 between the inner addresses and the outer addresses shown in the gratuitous message 720 of FIG. 8. As shown in FIG. 9, a multicast controller address (outer SA) is mapped to a client specific multicast address (inner SA), and a virtual network instance ID is mapped to a local virtual network ID (e.g., a VLAN ID).

Referring back to FIG. 7, once an overlay edge node has learned the mapping between the outer SA and the inner SA through the gratuitous message 720, the overlay edge node may then be able to direct multicast data frames to the multicast controller 710. Specifically, a multicast data frame sent from a VM attached to an overlay edge node (e.g., the data frame 640 in FIG. 6) may have a client specific multicast address as an inner DA. When encapsulating the multicast data frame, the overlay edge node may, based on the mapping between the client specific multicast address and the multicast controller address, add the address of the multicast controller 710 to be the outer DA of the multicast data frame.

Figure 10:
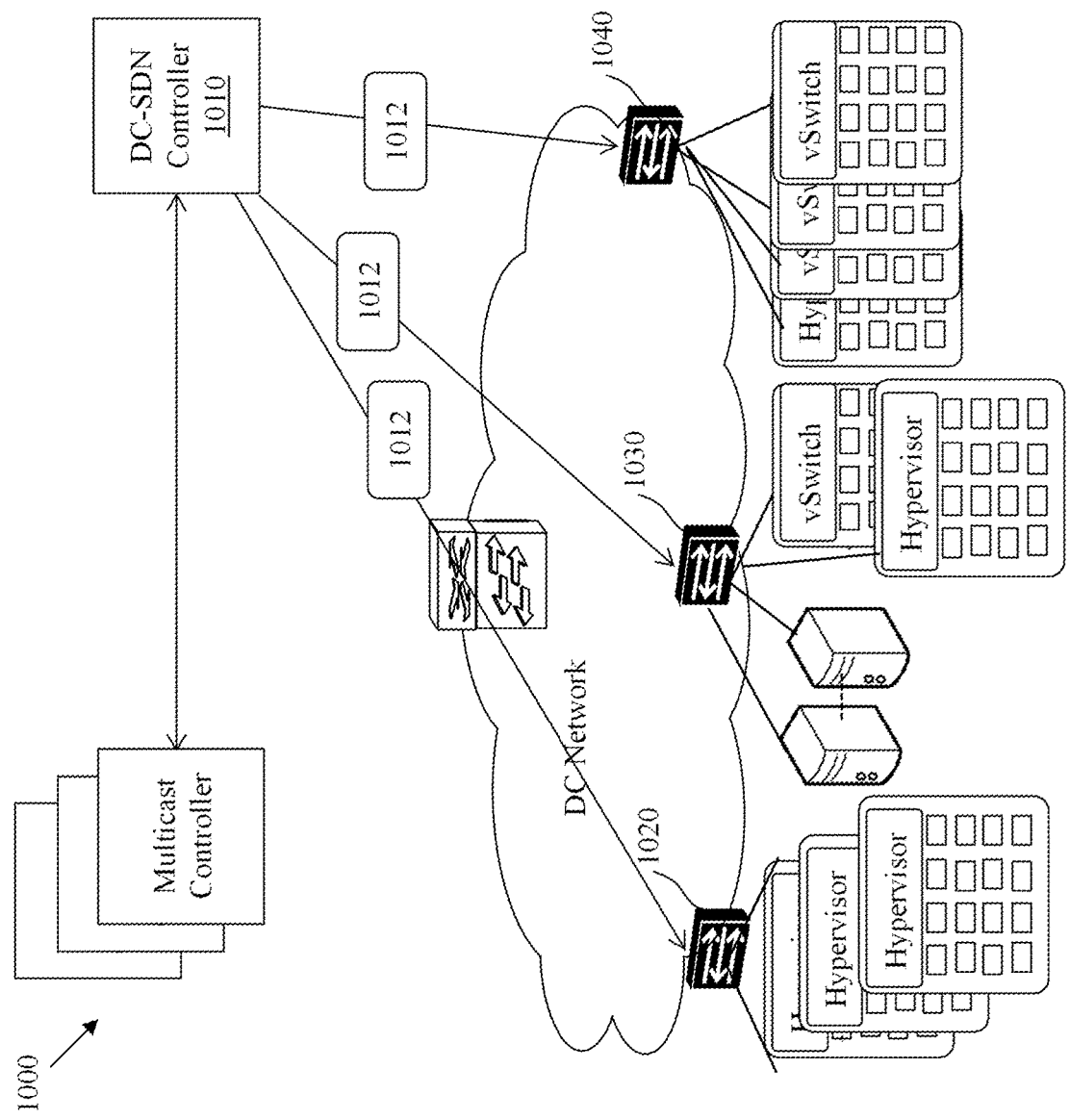
FIG. 10 illustrates an embodiment of a mapping mechanism.

Alternatively, overlay edge nodes may get inner-outer address mapping from external entities, such as directory server(s) or a DC management system (e.g., the DC management system 322). For example, a directory server may provide all overlay edge nodes with the proper inner-outer address mapping for all multicast addresses. FIG. 10 illustrates an embodiment of a mapping mechanism 1000, in which a DC-SDN controller 1010 may play the role of directory server. Specifically, the DC-SDN controller 1010 may send messages 1012 to overlay edge nodes 1020, 1030, and 1040. The messages 1012 may have any format, such as standardized format used in OpenFlow or SDN, and may provide to overlay edge nodes 1020, 1030, and 1040 with information regarding mapping between overlay outer address and inner address (e.g., mapping relationship 900). Thus, overlay edge nodes 1020, 1030, and 1040 do not need to learn the mapping by themselves anymore. The mapping mechanism 1000 may be useful for overlay edge nodes that do not learn inner-outer address mapping from a data plane. Regardless of whether for unicast or multicast data frames, the overlay edge nodes 1020, 1030, and 1040 may get all their inner-outer address mapping information from the DC-SDN controller 1010.

In the present disclosure, the state maintenance of multicast groups may be performed by a multicast controller rather than a designated multicast router, which is the entity responsible for sending out IGMP queries to trigger hosts to respond with IGMP reports. According to embodiments disclosed herein, when VMs are added to an overlay edge node, deleted from an overlay edge node, or moved from one overlay edge node to another, the multicast controller may send out IGMP queries to update multicast group information.

Figure 11:
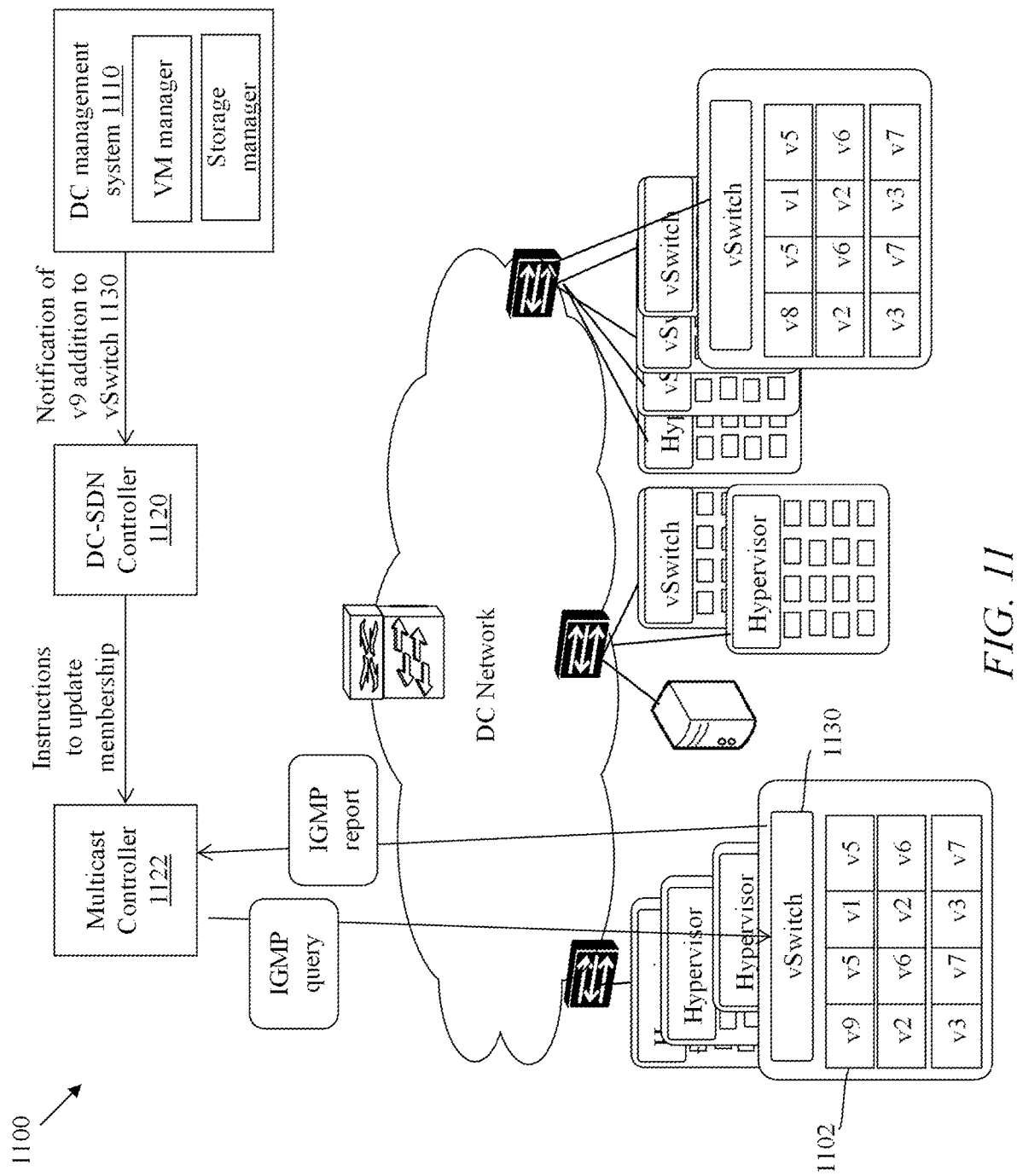
FIG. 11 illustrates an embodiment of a multicast group updating protocol.

FIG. 11 illustrates an embodiment of a multicast group updating scheme or protocol 1100, which may be implemented when a VM is added to a vSwitch. As shown in FIG. 11, a DC management system 1110 may be aware of any VM changes, thus the DC management system 1110 may know which vSwitch the VM has been added to. The DC management system 1110 may send notification information to a DC-SDN controller 1120 to notify that a VM 1102 (denoted as v9) has been added to a vSwitch 1130. The DC-SDN controller 1120 may instruct a multicast controller 1122, which may be embedded within the DC-SDN controller 1120, to perform a multicast group update.

Recall that the DC-SDN controller 1120 may have membership information of all multicast groups present in the DC, thus the multicast controller 1122 can be provided with such information including all multicast addresses. Then, for each multicast group present in the DC, the multicast controller 1122 may send out a "fake" IGMP query to the vSwitch 1130. The IGMP query is considered a fake query message because, in the context of a conventional DC, the multicast controller 710 is not supposed to send out query messages. Rather, the query messages should be sent out by a replication point or a designated multicast router.

The vSwitch 1130 may decapsulate each IGMP query by removing the outer header and send only the inner data frame to VMs attached, including the VM 1102. The VMs may receive the IGMP query just as if the IGMP query was sent out from a designated multicast router. Then, among the received IGMP queries, the VM 1102 may respond to any IGMP query corresponding to one or more multicast groups which the VM 1102 is a member of. Specifically, the VM 1102 may respond by sending an IGMP report back to the multicast controller 1122 via the vSwitch 1130 to indicate which multicast group(s), if any, the VM 1102 is a member of. After receiving the IGMP report, the multicast controller 1122 may add the VM 1102 to one or more multicast groups.

FIG. 12 illustrates an embodiment of an IGMP query 1200 before decapsulation by the vSwitch 1130. The IGMP query 1200 may comprise an outer DA, an outer SA, a virtual network instance ID, an inner DA, an inner SA, a local virtual network ID, and a payload. In the outer header of the IGMP query 1200, the outer DA may be an address of the vSwitch 1130, and the outer SA may be the address of the multicast controller 1122. In the inner header of the IGMP query 1200, the inner DA may be a generic multicast address (e.g., reserved as IP 224.0.0.1 or MAC 01005e010101), or a client specific multicast address (e.g., IP 239.5.5.5 or MAC 01005e050505). Further, the inner SA may be a pseudo address of the multicast controller 1122, and the payload may be contents of the IGMP query. The reason for using pseudo address of the multicast controller 1122 may be to make the inner SA different from the outer SA in case overlay edge nodes may be confused. But sometimes, it may not be a problem to use the same address in the inner SA field and the outer SA field. When this happens, the pseudo address is the same as the real address.

FIG. 13 illustrates an embodiment of an IGMP report 1300 after encapsulation by the vSwitch 1130. The IGMP report 1300 may comprise an outer DA, an outer SA, a virtual network instance ID, an inner DA, an inner SA, a local virtual network ID, and a payload. In the outer header of the IGMP report 1300, the outer DA may be an IP address of the multicast controller 1122, and the outer SA may be an address of the vSwitch 1130. In the inner header of the IGMP report 1300, the inner DA may be a MAC address of the multicast controller 1122, and the inner SA may be an address of the VM 1102. Further, the payload may be contents of the IGMP report.

Although IGMP queries and reports are used as an example, it should be understood that, depending on the IP version, the query and report messages may be implemented using different formats. For example, if IP version 4 (IPv4) is used, the query message may be an IGMP query, and the report message may be an IGMP report. For another example, if IP version 6 (IPv6) is used, the query message may be a multicast listener discovery (MLD) query, and the report message may be a MLD report. Further, as both IPv6 and IPv4 may be present in a DC, suitable message formats may be used accordingly. For example, when hosts (e.g., applications running on VMs) are IPv6 enabled, the multicast controller may use MLD in the same fashion as IPv4's IGMP. If the overlay edge nodes are IPv4 based, then the outer header to encapsulate data frames may be the same as described above, even though the inner addresses are IPv6 based. If the overlay edge nodes use IPv6 addresses, then the outer header to encapsulate data frames may be IPv6 addresses.

Figure 14:
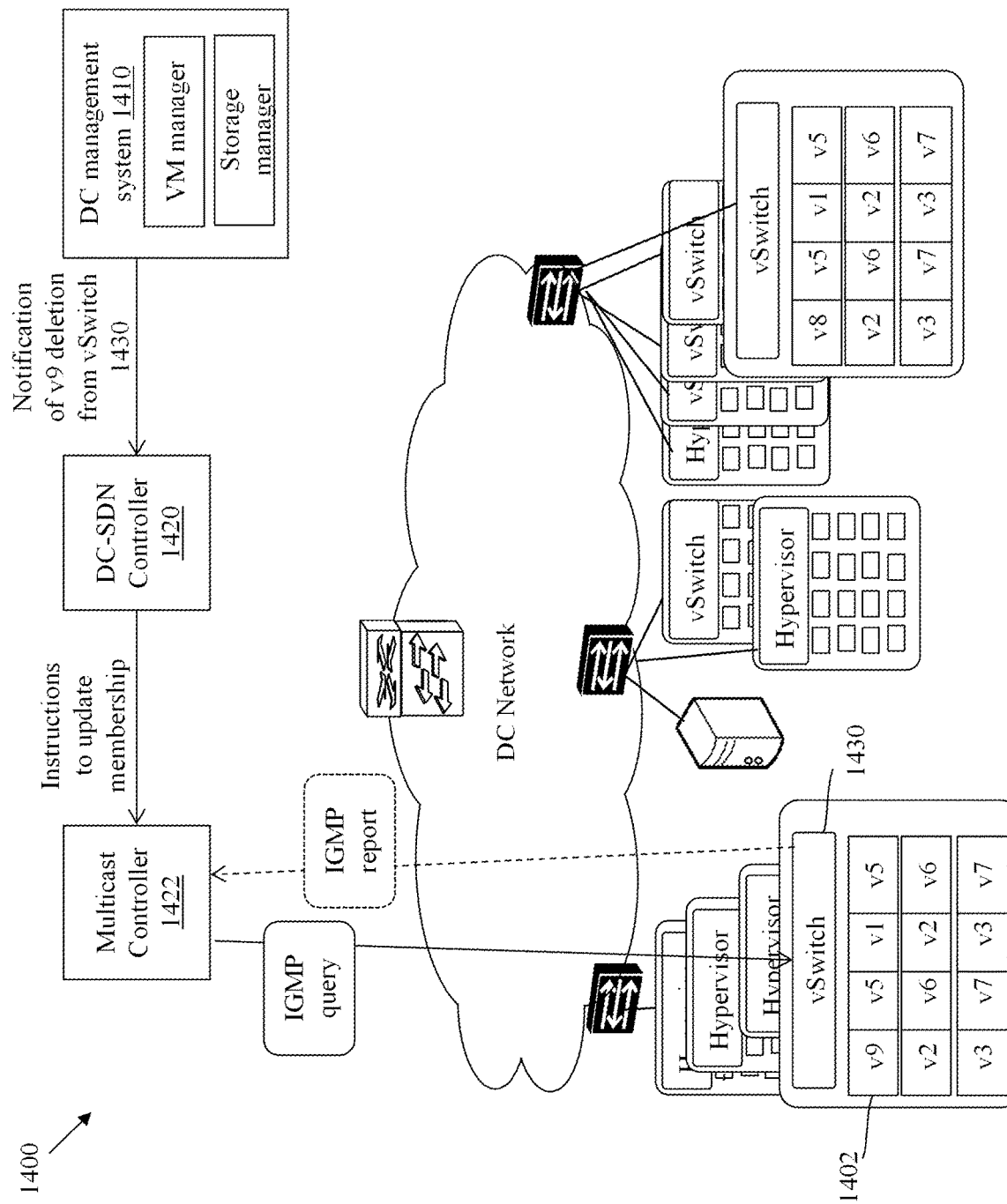
FIG. 14 illustrates another embodiment of a multicast group updating protocol.

FIG. 14 illustrates an embodiment of a multicast group updating protocol 1400, which may be implemented when a VM is removed from a vSwitch. As shown in FIG. 14, a DC management system 1410 may be aware of any VM changes, thus the DC management system 1410 may know which vSwitch the VM has been removed from. The DC management system 1410 may notify a DC-SDN controller 1420 that a VM 1402 (denoted as v9) has been removed from a vSwitch 1430. The DC-SDN controller 1420 may instruct a multicast controller 1422 to perform a multicast group update.

The multicast controller 1422 can be provided with information including an address of the vSwitch 1430 and all multicast addresses. Then, for each multicast group present in the DC, the multicast controller 1422 may send out a "fake" IGMP query to the vSwitch 1430. The vSwitch 1430 may decapsulate each IGMP query by removing the outer header and send only the inner data frame to VMs attached (not including the VM 1402 since it has been removed). If there are other VMs under the vSwitch being members of a multicast group, they may send out IGMP reports to the multicast controller 1422 corresponding to that multicast group. Otherwise, if the VM 1402 was the last VM belonging to the multicast group, no VM under the vSwitch 1422 may send out any corresponding IGMP report. When an overlay edge node does not have any VMs or hosts sending traffic to any multicast group, the DC-SDN controller 1420 may remove the overlay encapsulation tuple from the overlay edge node.

Figure 15:
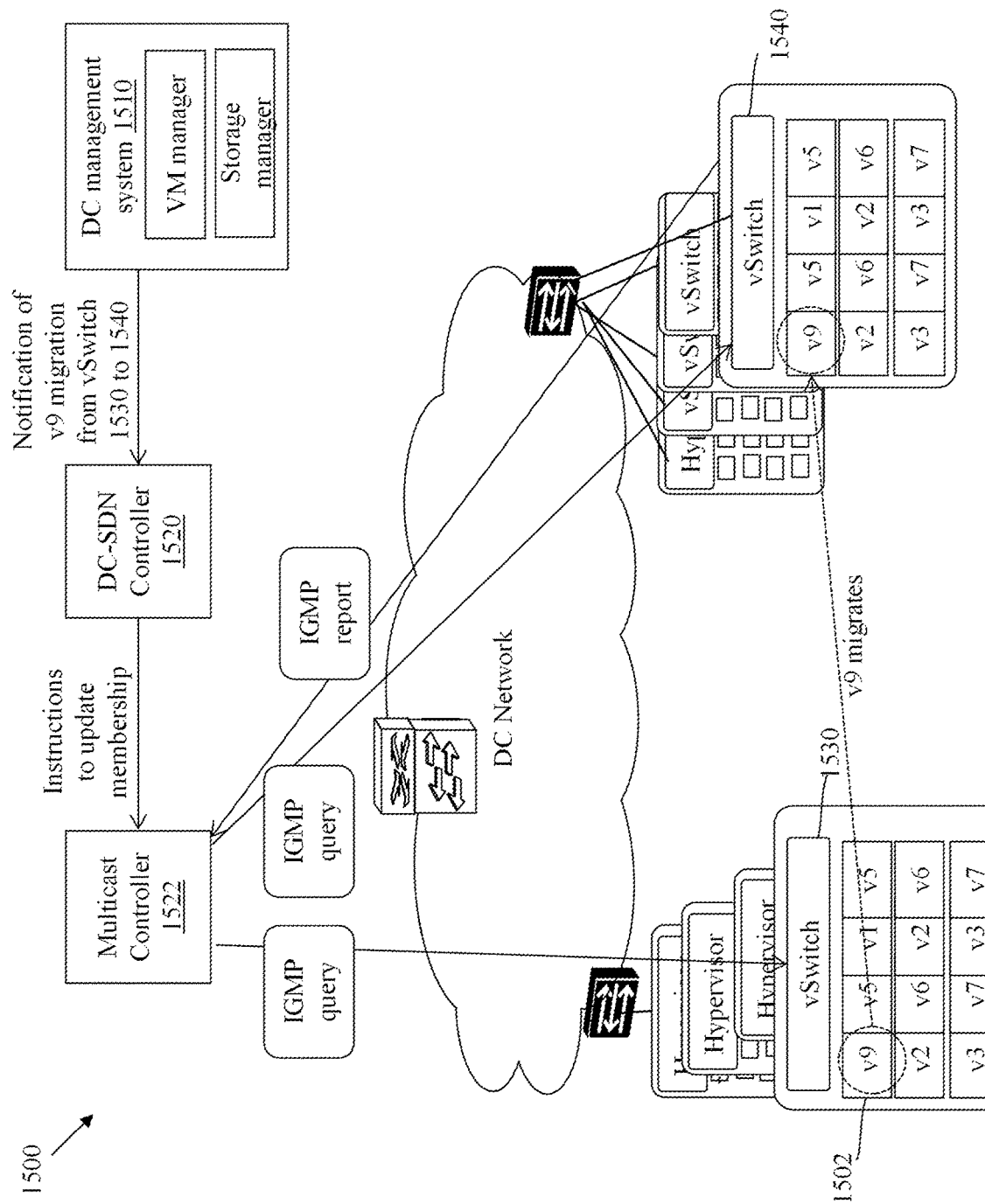
FIG. 15 illustrates yet another embodiment of a multicast group updating protocol.

FIG. 15 illustrates an embodiment of a multicast group updating protocol 1500, which may be implemented when a VM is moved or migrated from one vSwitch to another. As shown in FIG. 15, a DC management system 1510 may notify a DC-SDN controller 1520 that a VM 1502 (denoted as v9) has been removed from a vSwitch 1530 to another vSwitch 1540. The DC-SDN controller 1520 may then instruct a multicast controller 1522 to perform a multicast group update. The multicast controller 1522 can be provided with information including addresses of the vSwitches 1530 and 1540 and all multicast addresses. Then, for each multicast group present in the DC, the multicast controller 1522 may send out a "fake" IGMP query to both the vSwitches 1530 and 1540. The vSwitches 1530 and 1540 may decapsulate each IGMP query by removing the outer header and send only the inner data frame to VMs attached.

Within a server comprising the vSwitch 1530, if there are other VMs being members of a multicast group, they may send out IGMP reports to the multicast controller 1522 corresponding to that multicast group. Otherwise, if the VM 1502 was the last VM belonging to the multicast group, no VM under the vSwitch 1530 may send out any corresponding IGMP report. In addition, within a server comprising the vSwitch 1540, the VM 1502 may respond to any IGMP query corresponding to one or more multicast groups which the VM 1502 is a member of Specifically, the VM 1502 may respond by sending an IGMP report back to the multicast controller 1522 via the vSwitch 1540 to indicate which multicast group(s), if any, the VM 1502 is a member of After receiving the IGMP report, the multicast controller 1522 may add the VM 1502 to one or more multicast groups with updated information.

In the present disclosure, since IGMP snooping may be performed by a multicast controller (e.g., the multicast controller 1122, 1422, or 1522), there is no longer a need for any overlay edge node to perform IGMP snooping. This may be an advantage, as IGMP snooping may not work well with some overlay edge nodes that add an extra header to data frames to/from VMs without any changes to existing switches and routers in the network.

Figure 16:
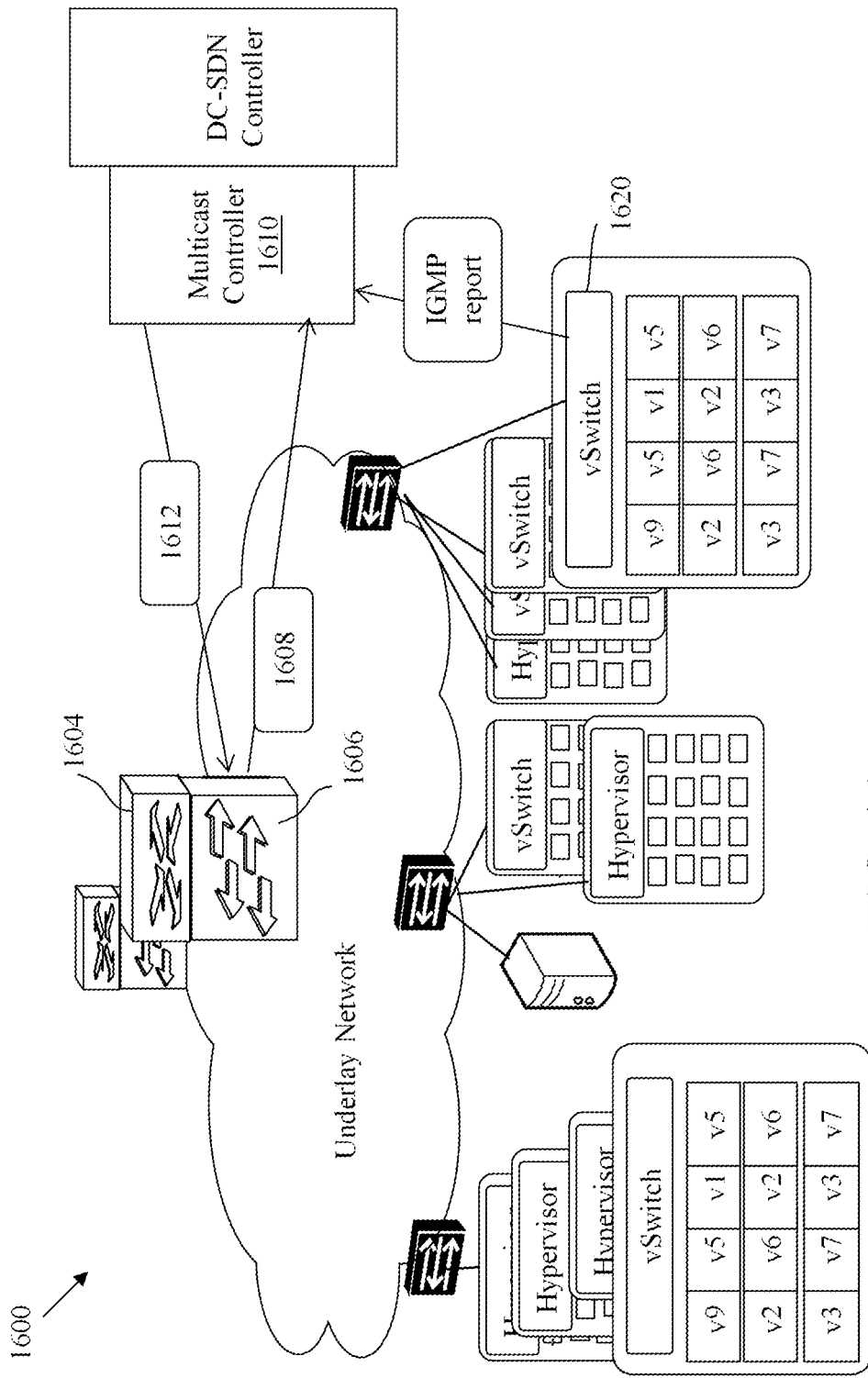
FIG. 16 illustrates yet another embodiment of a multicast group updating protocol.

As mentioned previously, there may be multicast routers present in a DC that are designated to maintain the states of multicast groups. Each local area network (LAN) or virtual LAN (VLAN) may have a designated multicast router. In this disclosure, there may be little, if any at all, change to multicast routers. FIG. 16 illustrates an embodiment of a multicast group updating protocol 1600, which involves a designated multicast router 1604. The multicast router 1604 may normally be outside of or co-located with overlay edge nodes. For example, as shown in FIG. 16, there is a corresponding overlay edge node 1606 coupled to the designated multicast router 1604. The multicast router 1604 may send out IGMP queries periodically to update multicast group members, and the overlay edge node 1606 may encapsulate an outer header to any IGMP query sent by the multicast router 1604. In an embodiment, an IGMP query 1608 encapsulated by the overlay edge node 1606 is re-directed to a multicast controller 1610. In use, the multicast controller 1610 may send, to the overlay edge node 1606, a gratuitous message comprising an address of the multicast controller 1610 as an outer SA and a client specific multicast address as an inner SA. The gratuitous message may be interpreted or read by the overlay edge node 1606 to learn proper inner-outer address mapping, such that the overlay edge node 1606 may correctly direct the IGMP query 1608 to the multicast controller 1610.

FIG. 17 illustrates an embodiment of the IGMP query 1608. The IGMP query 1608 may comprise an outer DA, an outer SA, a virtual network instance ID, an inner DA, an inner SA, a local virtual network ID, and a payload. In the outer header of the IGMP query 1608, the outer DA may be an address of the multicast controller 1610, and the outer SA may be an address of the overlay edge node 1606. In the inner header of the IGMP query 1608, the inner DA may be a generic multicast address (e.g., reserved as IP 224.0.0.1 or MAC 01005e010101), or a client specific multicast address (e.g., IP 239.5.5.5 or MAC 01005e050505). Further, the inner SA may be the MAC address of the designated multicast router 1604, and the payload may be contents of the IGMP query.

Referring back to FIG. 16, the multicast controller 1610 may forward the IGMP query 1608 to overlay edge nodes, to which members of the multicast group are coupled or attached to. Specifically, the multicast controller 1610 may first receive the IGMP query 1608 from the overlay edge node 1606. Then, the multicast controller 1610 may re-encapsulate the IGMP query 1608 by replacing, in its outer DA, the address of the multicast controller 1610 with an address of the vSwitch 1620. The multicast controller 1610 may then send the re-encapsulated IGMP query to the vSwitch 1620 to which at least one member of the multicast group is attached. One or more IGMP reports may be sent back by the members and received by the multicast controller 1610. For example, an IGMP report may be generated by a VM 1622 coupled to a vSwitch 1620. Then, the multicast controller 1610 may forward the IGMP reports, such as an IGMP report 1612, on behalf of the host back to the designated multicast router 1604. Specifically, the multicast controller 1610 may first receive the IGMP report from the vSwitch 1620. Then, the multicast controller 1610 may re-encapsulate the IGMP report by replacing, in its outer DA, the address of the multicast controller 1610 with an address of the overlay edge node 1606. The multicast controller 1610 may then send the re-encapsulated IGMP report to the overlay edge node 1606. Further, the multicast controller 1610 may forward another IGMP query corresponding to another multicast group to overlay edge nodes.

Usually the overlay edge node 1606 may have the capability to process multicast functions. Thus, when multicast data frames come from the multicast router 1604, all VMs attached to vSwitches in the overlay network may receive the data frames. Under these circumstances, multicast data frames from the multicast router 1604 may be sent directly to overlay edge nodes, to which members of a multicast group are attached. To send multicast data frames directly to overlay edge nodes, the overlay edge node 1606 needs to learn proper inner-outer address mapping by snooping IGMP reports. Thus, the IGMP reports forwarded by the multicast controller 1610 may need to appear to have been sent directly from overlay edge nodes (e.g., the overlay edge node 1620) to the multicast router 1604. For this purpose, the multicast router 1604 may fake the inner and outer SAs, so that the overlay edge node 1606 may learn correctly.

FIG. 18 illustrates an embodiment of the IGMP report 1612 after encapsulation by the multicast controller 1610. The IGMP report 1612 may comprise an outer DA, an outer SA, a virtual network instance ID, an inner DA, an inner SA, a local virtual network ID, and a payload. In the outer header of the IGMP report 1612, the outer DA may be an address of the overlay edge node 1606, and the outer SA may be an address of an overlay edge node (e.g., the vSwitch 1620) from which the IGMP report 1612 was originally generated. In the inner header of the IGMP report 1612, the inner DA may be the MAC address of the overlay edge node 1606, and the inner SA may be an address of the VM 1622. Note that the outer and inner SAs are not addresses of the multicast controller 1610, which is the actual source of the IGMP report 1612.

In some embodiments, when overlay edge nodes are capable of supporting multicast functions, e.g., in the case of the overlay edge node 1606, the multicast controller 1610 may be notified of this capability. Notification may be completed by either configuration or messages sent from corresponding overlay edge nodes to the multicast controller 1610. If the vSwitch 1620 (an example of an overlay edge node) is capable of supporting multicast, the vSwitch 1620 may notify the multicast controller 1610, so that only one copy of a data frame needs to be sent to or from the vSwitch 1620. Accordingly, the multicast controller 1610 only needs to replicate a multicast data frame with a multicast address to reach all destination VMs including the VM 1622. In this case, however, the vSwitch 1620 may need enough intelligence to avoid sending multicast frame back to a sender.

Figure 19:
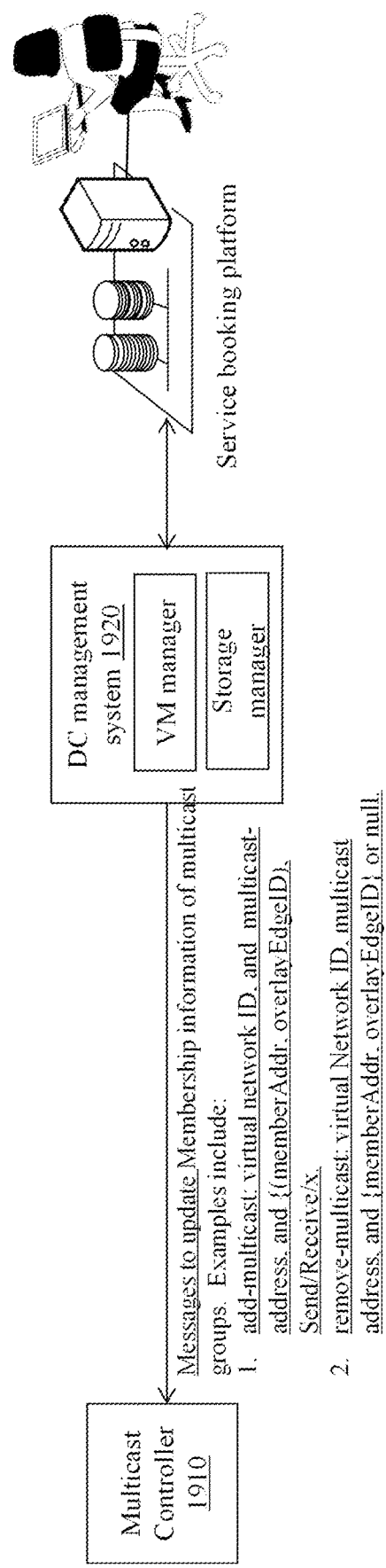
FIG. 19 illustrates yet another embodiment of a multicast group updating protocol.

Alternative to using query and report messages to establish multicast membership, in some embodiment, a multicast controller 1910 may also get the membership information from a DC management system 1920, as shown in a multicast group updating protocol 1900 in FIG. 19. Specifically, to add a new multicast group or add members to an existing multicast group, the DC management system 1920 may send a message (denoted as add-multicast) to the multicast controller 1910 with the following attributes: a virtual network ID, a multicast address, and {(memberAddr, overlayEdgeID), Send/Receive/x} for each member of the multicast group. Note that when capability information is null (denoted as x), every VM in the virtual network may be a sender or a receiver in this multicast group. In addition, to remove members from an existing multicast group, or delete the multicast group, the DC management system 1920 may send a message (denoted as remove-multicast) to the multicast controller 1910 with the following attributes: a virtual network ID, a multicast address, and the (memberAddr, overlayEdgeID) of the member to be removed. Note that when (memberAddr, overlayEdgeID) is null, the entire multicast group having the multicast address is to be removed.

Figure 20:
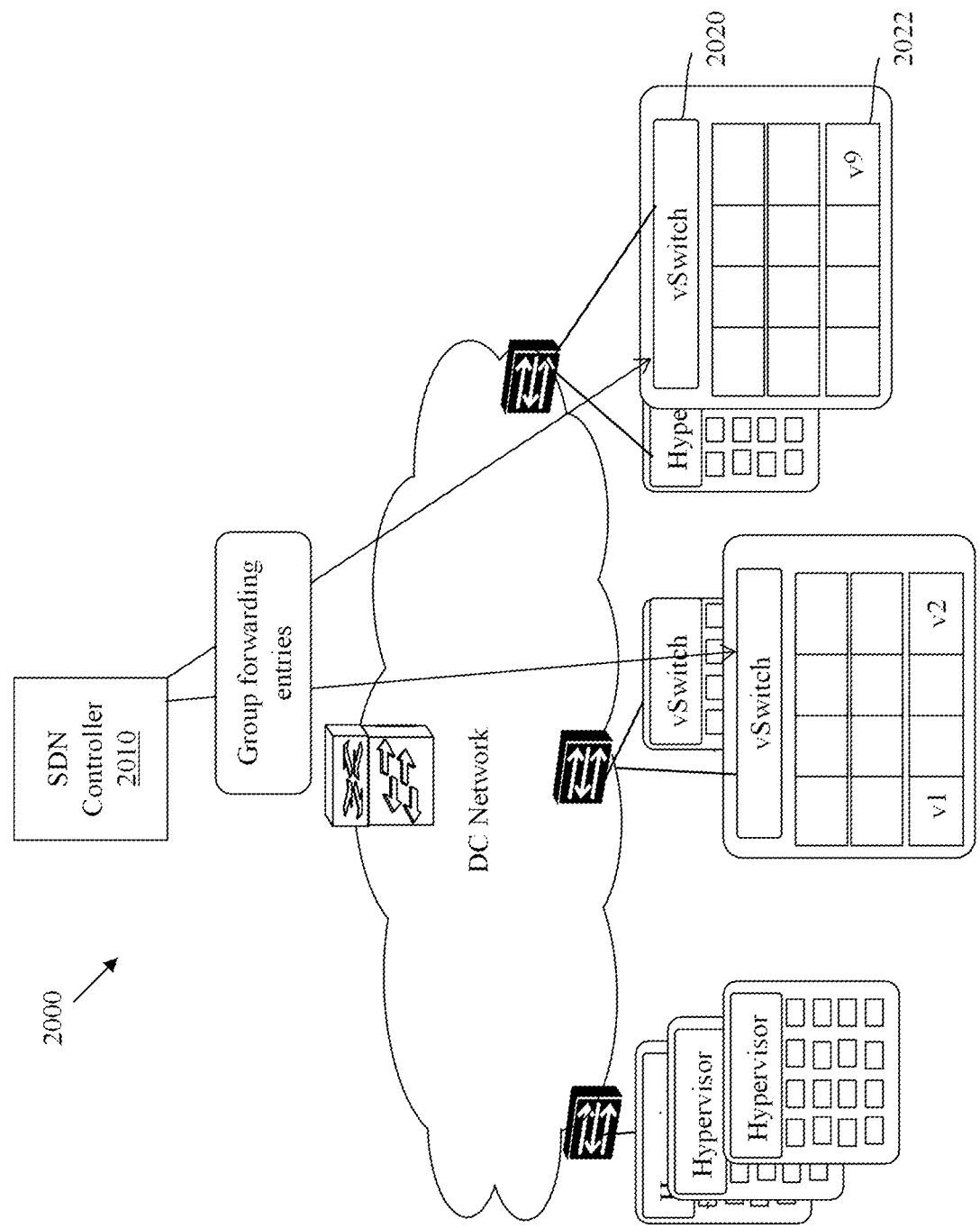
FIG. 20 illustrates yet another embodiment of a multicast group updating protocol.

In some embodiment, depending on whether an overlay edge node supports IGMP (e.g., IGMP version 2 or version 3) snooping, a SDN controller and the overlay edge node may take different actions to update membership information of multicast groups. FIG. 20 illustrates an embodiment of a multicast group updating protocol 2000, which assumes that a VM 2022 (denoted as v9) attached to the vSwitch 2020 is being added or subscribed to a multicast group with a multicast address 239.5.5.5. If the vSwitch supports IGMP snooping, the SDN controller 2010 may simply send out an IGMP query, while the vSwitch 2020 may snoop an IGMP report sent from the VM 2022. Otherwise, if the vSwitch does not support IGMP snooping, the SDN controller 2010 may send out an IGMP query, receive an IGMP report sent from the VM 2022, and perform update of multicast membership information (e.g., as described with respect to FIGS. 11, 14, and 15). Further, the SDN controller 2010 needs to send the updated group forwarding entries to the vSwitch 2020. The information may be stored, for example, in a forwarding database (FDB) of the vSwitch 2020. The vSwitch 2020 may do nothing more than forwarding and encapsulating the IGMP query and report.

Figure 21:
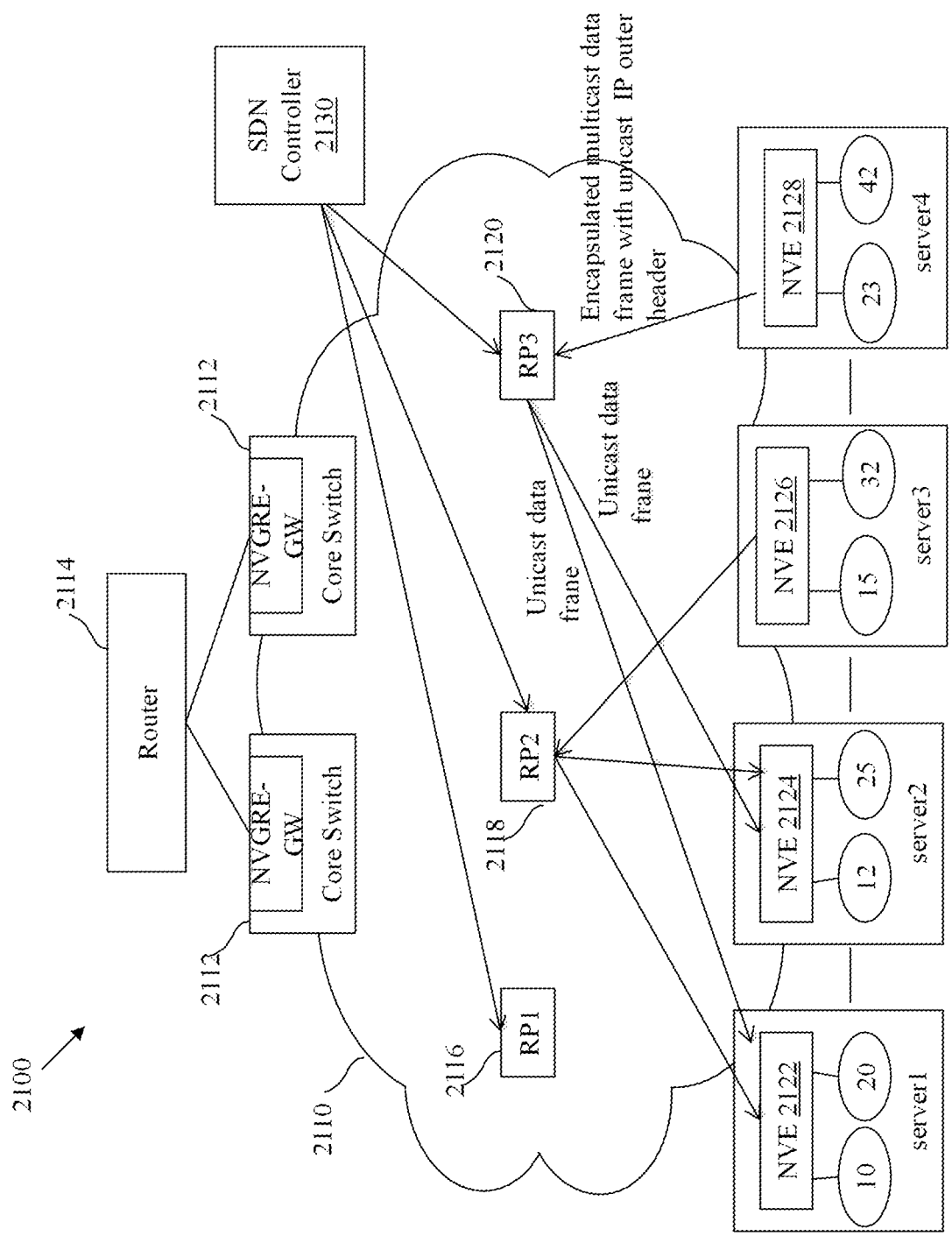
FIG. 21 illustrates an embodiment of a multicast scheme.

FIG. 21 illustrates an embodiment of a multicast scheme 2100, which may be implemented in a DC (e.g., the DC 310). As shown in FIG. 21, an overlay network 2110 may comprise one or more switches 2112, a router 2114, a plurality of multicast replication points (RPs) including RPs 2116, 2118, and 2120, a plurality of NVEs including NVEs 2122, 2124, 2126, and 2128. The switches 2112 may comprise NVGRE gateways interacting with the router 2114, which serves as an interface to other networks. The NVEs 2122-2128 are configured inside servers and are each coupled to a plurality of hosts (denoted as 10, 20, 12, 25, 15, 32, 23, and 42). Each of the RPs 2116-2120 may be assigned to hosts of a client, part of a client, or multiple clients. A SDN controller 2130 may be configured to manage the functions of RPs 2116-2120. For example, the SDN controller 2130 may share with the RP 2120 some of its membership information of multicast groups, which may be consistent with the client(s) the RP 2120 is assigned to. In addition, the SDN controller 2130 may manage failover for RPs without NVEs being aware of any membership change.

As mentioned previously, the present disclosure enables NVEs (e.g., vSwitches) to treat multicast data frames as if they were unicast frames, yet achieve the purpose of multicast. In the protocol 2100, depending on whether a NVE support multicast, multicast data frames may be delivered from a source to multiple destination hosts differently. Suppose, for example, that the host 23 sends out a multicast data frame with a multicast address (hosts 10 and 12 are members of a multicast group identified by the multicast address). Due to the inner-outer address mapping described earlier, the NVE 2128 knows the path to the RP 2120, thus the NVE 2128 routes the multicast data frame to the RP 2120, which is in charge of forwarding the multicast data frame to its receiving NVEs 2122 and 2124. The RP 2120 may have several options of delivering the multicast data frame. As a first option, the NVE 2120 may replicate the multicast data frame with unicast addresses (e.g., change the inner DA from the multicast address to addresses of host 10 and 12 in two replications respectively). This may provide the advantage for simple processing by the NVEs 2122 and 2124, as they receive only unicast data frames. The first option may be useful for NVEs that do not support any multicast functions. As a second option, the multicast controller 610 may replicate the data frame 640 still with the multicast address as its inner DA. The second option may provide an advantage that only one copy of the multicast data frame needs to be sent to one receiving NVE, even if the NVE has multiple receiving hosts for the multicast data frame. However, to use the second option, the receiving NVEs may need capability or intelligence to avoid sending the multicast data frame back to the sender (e.g., the host 23). Further, to support the second option, the RP 2120 may need to be notified of the multicast support by the receiving NVEs 2122 and 2124, either by configurations or messages from the NVEs 2122 and 2124.

Figure 22:
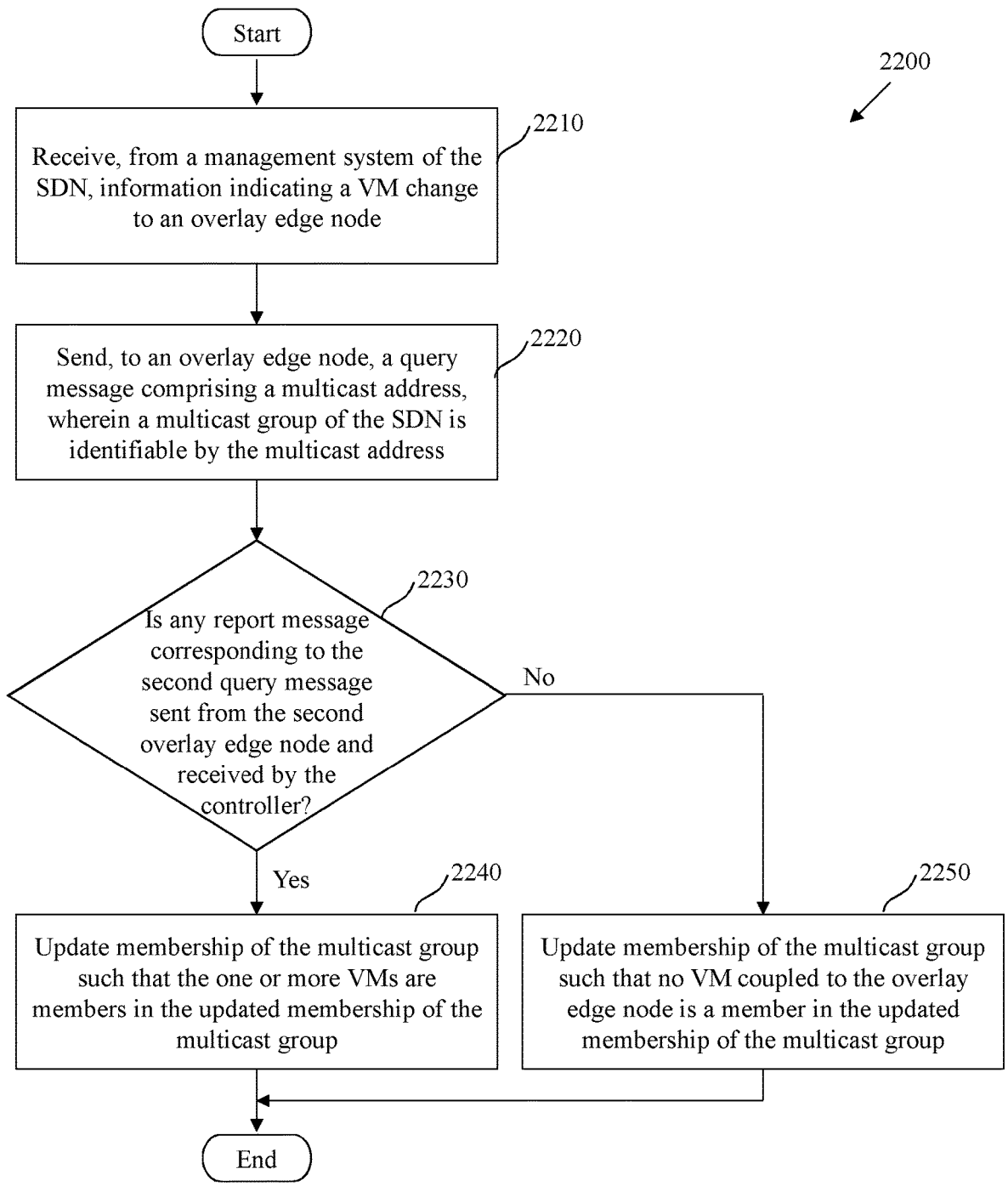
FIG. 22 illustrates an embodiment of a multicast method.

FIG. 22 illustrates an embodiment of a multicast method 2200, which may be implemented by a controller in a SDN (e.g., the CD-SDN controller 320, or the multicast controller 610). The method 2200 may be used to update membership of a multicast group, which may be identifiable by a multicast address (a generic multicast address or a client specific multicast address). Note that the method 2200 only shows the updating protocol for one multicast group and between the CD-SDN and one overlay edge node as an example, thus in use the method 2200 may be repeated for a plurality of overlay edge nodes and for a plurality of multicast groups.

The method 2200 starts in step 2210, in which the method 2200 may receive, from a management system of the SDN, information indicating a VM change to an overlay edge node. The VM change may be a VM addition or a VM deletion. Further, note that a VM move from a first overlay edge node to a second overlay edge node may be considered the combination of a VM addition to the second overlay edge node and a VM deletion from the first overlay edge node. In step 2220, the method 2200 may send, to the overlay edge node, a query message comprising the multicast address. In step 2230, the method 2200 may determine whether one or more report messages corresponding to the second query message are sent from the second overlay edge node and received by the controller. If the condition in step 2230 is met, the method may proceed to step 2240; otherwise, the method may proceed to step 2250.

If one or more report messages are received by the controller in step 2230, each of the one or more report messages comprises an address of each of one or more virtual machines (VMs) coupled to the overlay edge node. Thus, in step 2240, the method 2200 may update membership of the multicast group such that the one or more VMs are members in the updated membership of the multicast group. If no report message is received by the controller in step 2230, in step 2250, the method 2200 may update membership of the multicast group such that no VM coupled to the overlay edge node is a member in the updated membership of the multicast group. It should be understood that members of the multicast group may change or remain the same during each time of updating the membership.

Figure 23:
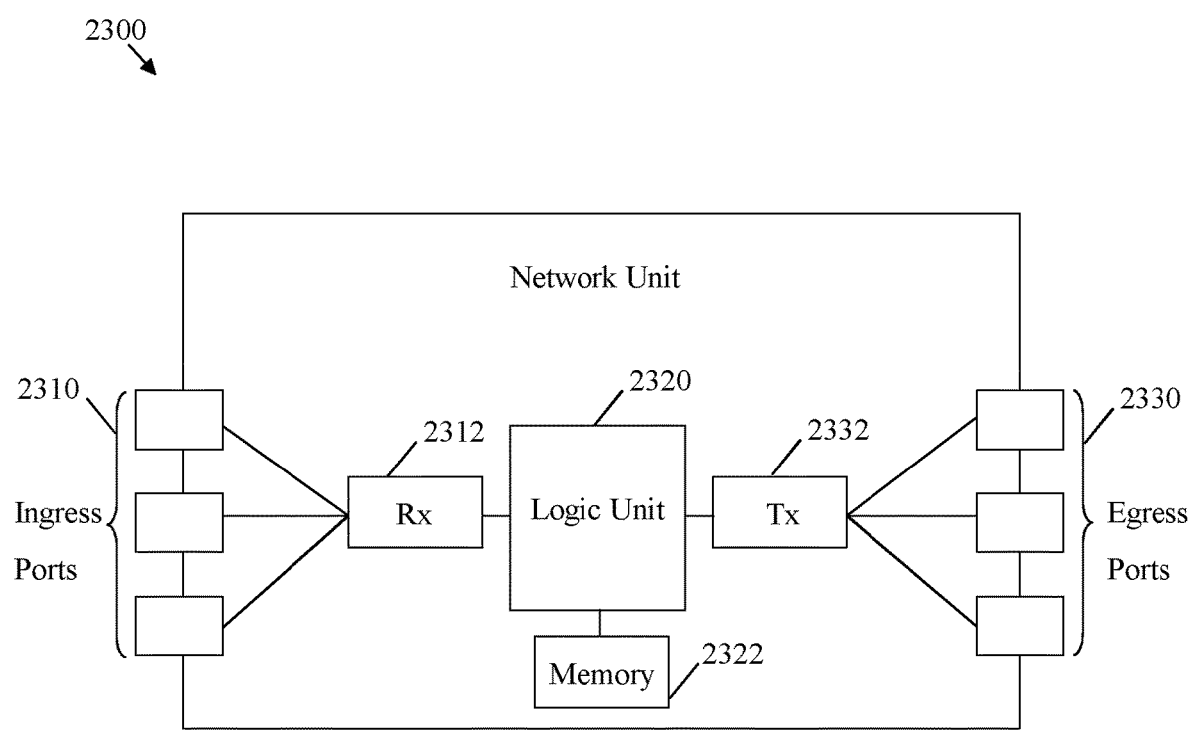
FIG. 23 illustrates an embodiment of a network device or unit.

FIG. 23 illustrates an embodiment of a network device or unit 2300, which may be any device configured to transport data frames or packets through a network. The network unit 2300 may comprise one or more ingress ports 2310 coupled to a receiver 2312 (Rx), which may be configured for receiving packets or frames, objects, options, and/or Type Length Values (TLVs) from other network components. The network unit 2300 may comprise a logic unit or processor 2320 coupled to the receiver 2312 and configured to process the packets or otherwise determine to which network components to send the packets. The logic unit or processor 2320 may be implemented using hardware, software, or both. The network unit 2300 may further comprise a memory 2322. A hypervisor (e.g., the hypervisor 210) may be implemented using a combination of the logic unit 2320 and the memory 2322. The network unit 2300 may also comprise one or more egress ports 2330 coupled to a transmitter 2332 (Tx), which may be configured for transmitting packets or frames, objects, options, and/or TLVs to other network components. The logic unit or processor 2320, the receiver 2312, and the transmitter 2332 may also be configured to implement or support any of the schemes and methods described above, such as the multicast protocol 600, the mapping mechanism 700, the mapping mechanism 1000, the multicast group updating protocols 1100, 1400, 1500, 1600, 1900, 2000, and the method 2200.

Figure 24:
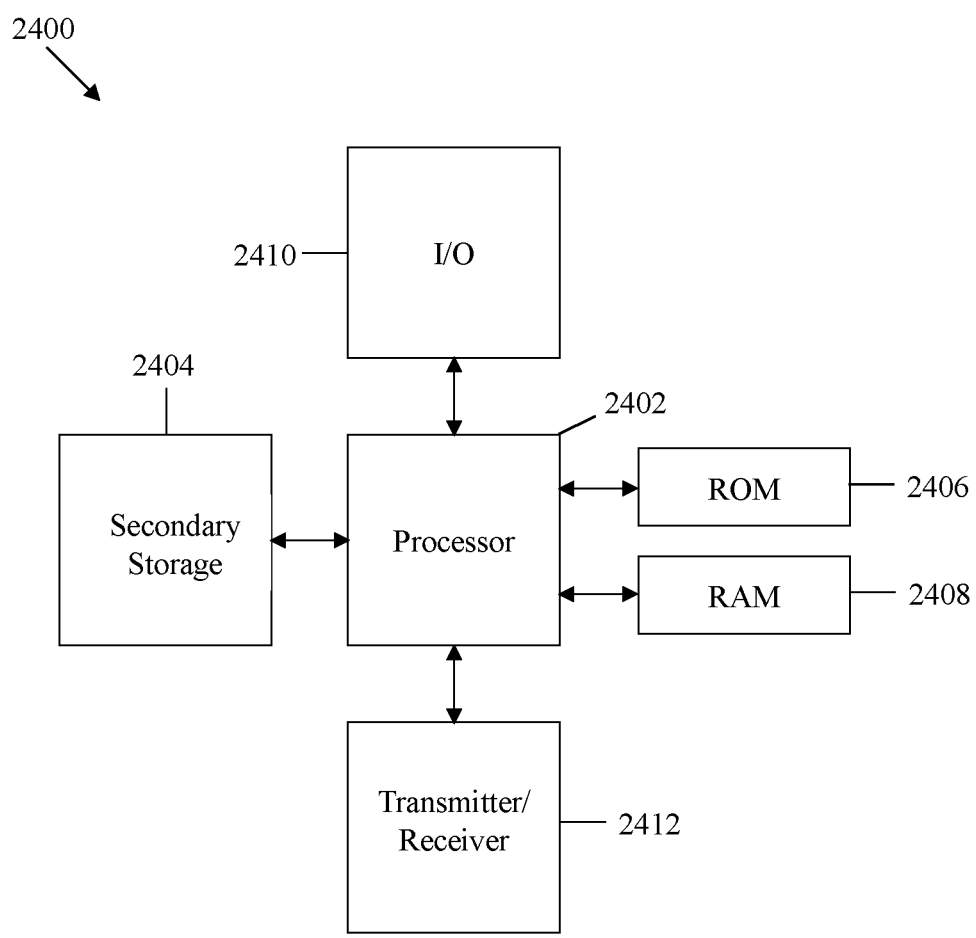
FIG. 24 illustrates an embodiment of a network node.

The schemes described above may be implemented on a network component, such as a computer or network component with sufficient processing power, memory resources, and network throughput capability to handle the necessary workload placed upon it. FIG. 24 illustrates an embodiment of a computer system or network node 2400 suitable for implementing one or more embodiments of the systems disclosed herein, such as the server 112, the overlay edge nodes or NVEs described above.

The NETWORK NODE includes a processor 2402 that is in communication with memory devices including secondary storage 2404, read only memory (ROM) 2406, random access memory (RAM) 2408, input/output (I/O) devices 2410, and transmitter/receiver (transceiver) 2412. Although illustrated as a single processor, the processor 2402 is not so limited and may comprise multiple processors. The processor 2402 may be implemented as one or more central processor unit (CPU) chips, cores (e.g., a multi-core processor), field-programmable gate arrays (FPGAs), application specific integrated circuits (ASICs), and/or digital signal processors (DSPs). The processor 2402 may be configured to implement any of the schemes described herein, including the multicast protocol 600, the mapping mechanism 700, the mapping mechanism 1000, the multicast group updating protocols 1100, 1400, 1500, 1600, 1900, 2000, and the method 2200. The processor 2402 may be implemented using hardware or a combination of hardware and software.

The secondary storage 2404 is typically comprised of one or more disk drives or tape drives and is used for non-volatile storage of data and as an over-flow data storage device if the RAM 2408 is not large enough to hold all working data. The secondary storage 2404 may be used to store programs that are loaded into the RAM 2408 when such programs are selected for execution. The ROM 2406 is used to store instructions and perhaps data that are read during program execution. The ROM 2406 is a non-volatile memory device that typically has a small memory capacity relative to the larger memory capacity of the secondary storage 2404. The RAM 2408 is used to store volatile data and perhaps to store instructions. Access to both the ROM 2406 and the RAM 2408 is typically faster than to the secondary storage 2404.

The transmitter/receiver 2412 (sometimes referred to as a transceiver) may serve as an output and/or input device of the NETWORK NODE. For example, if the transmitter/receiver 2412 is acting as a transmitter, it may transmit data out of the NETWORK NODE. If the transmitter/receiver 2412 is acting as a receiver, it may receive data into the NETWORK NODE. Further, the transmitter/receiver 2412 may include one or more optical transmitters, one or more optical receivers, one or more electrical transmitters, and/or one or more electrical receivers. The transmitter/receiver 2412 may take the form of modems, modem banks, Ethernet cards, universal serial bus (USB) interface cards, serial interfaces, token ring cards, fiber distributed data interface (FDDI) cards, and/or other well-known network devices. The transmitter/receiver 2412 may enable the processor 2402 to communicate with an Internet or one or more intranets. The I/O devices 2410 may be optional or may be detachable from the rest of the NETWORK NODE. The I/O devices 2410 may include a video monitor, liquid crystal display (LCD), touch screen display, or other type of display. The I/O devices 2410 may also include one or more keyboards, mice, or track balls, or other well-known input devices.

It is understood that by programming and/or loading executable instructions onto the NETWORK NODE, at least one of the processor 2402, the secondary storage 2404, the RAM 2408, and the ROM 2406 are changed, transforming the NETWORK NODE in part into a particular machine or apparatus (e.g. an overlay edge node or a server (e.g., the server 112) comprising a hypervisor (e.g., the hypervisor 210) which in turn comprises a vSwitch (e.g., the vSwitch 212)) having the functionality taught by the present disclosure). The executable instructions may be stored on the secondary storage 2404, the ROM 2406, and/or the RAM 2408 and loaded into the processor 2402 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose CPU) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc ROM (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k^*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

The invention claimed is:

1. A multicast packet replication method comprising:
receiving, by a first overlay edge node, a multicast data packet from a sender attached to the first overlay edge node, wherein the multicast data packet comprises a multicast address associated with a multicast group;
encapsulating, by the first overlay edge node, the multicast data packet to generate a first data packet, wherein the first data packet comprises an encapsulation header and the multicast data packet, the encapsulation header comprises a virtual network ID;
sending, by the first overlay edge node, one first data packet via a first virtual extensible local area network (VXLAN) tunnel to a multicast replication point device;
receiving, by the multicast replication point device, the one first data packet via the first VXLAN tunnel from the first overlay edge node, wherein the first data packet comprises the encapsulation header and the multicast data packet, and wherein the encapsulation header comprises the virtual network ID encapsulated by the first overlay edge node and the multicast data packet comprises the multicast address associated with the multicast group;
replicating, by the multicast replication point device, the multicast data packet according to the virtual network ID to generate a plurality of data packets, wherein the plurality of data packets comprise a second data packet and a third data packet, the second data packet comprises an address of a second overlay edge node as an outer destination address (DA) and the multicast address as an inner DA, the third data packet comprises an address of a third overlay edge node as an outer DA and the multicast address as an inner DA;

sending, by the multicast replication point device, the second data packet via a second VXLAN tunnel to the second overlay edge node, the second VXLAN tunnel is a different tunnel with the first VXLAN tunnel; and sending, by the multicast replication point device, the third data packet via a third VXLAN tunnel to the third overlay edge node, the third VXLAN tunnel is a different tunnel with the first VXLAN tunnel.

2. The method of claim 1, further comprising:

obtaining, by the multicast replication point device, a membership information, wherein the membership information comprises relationship between a virtual network ID and information of an overlay edge node.

3. The method of claim 2, wherein the information of the overlay edge node comprises an address of the overlay edge node, or an identifier of the overlay edge node.

4. The method of claim 1, wherein the multicast data packet is encapsulated by a VXLAN header, wherein the VXLAN header comprises the virtual network ID.

5. The method of claim 1, wherein the multicast replication point device is implemented as an aggregation switch, or a core switch, a router, or a chip.

6. The method of claim 1, wherein the multicast replication point device is deployed in a data center (DC).

7. The method of claim 1, wherein the method further comprises:

receiving, by the second overlay edge node, the second data packet from the multicast replication device.

8. The method of claim 7, wherein the method further comprises:

decapsulating, by the second overlay edge node, the second data packet to obtain the multicast data packet;

multicasting, by the second overlay edge node, the multicast data packet to at least one receiver attached to the second overlay edge node.

9. A multicast packet replication system, comprising a multicast replication point device, a first overlay edge node, and a second overlay edge node, and a third overlay edge node, wherein the first overlay edge device is configured to:

receive a multicast data packet from a sender attached to the first overlay edge node, wherein the multicast data packet comprises a multicast address associated with a multicast group;

encapsulate the multicast data packet to generate a first data packet, wherein the first data packet comprises an encapsulation header and the multicast data packet, the encapsulation header comprises a virtual network ID;

send one first data packet via a first virtual extensible local area network (VXLAN) tunnel to the multicast replication point device;

wherein the multicast replication point device is configured to:

receive one first data packet from the first overlay edge node via the first VXLAN tunnel;

replicate the multicast data packet according to the virtual network ID to generate a plurality of data packets, wherein the plurality of data packets comprises a second data packet and a third data packet, the second data packet comprises an address of a second overlay edge node as an outer destination address (DA) and the multicast address as an inner DA, the third data packet comprises an address of a third overlay edge node as an outer DA and the multicast address as an inner DA;

send the second data packet to the second overlay edge node via a second VXLAN tunnel, wherein the second VXLAN tunnel is a different tunnel with the first VXLAN tunnel; and send the third data packet to the third overlay edge node via a third VXLAN tunnel, wherein the third VXLAN tunnel is a different tunnel with the first VXLAN tunnel;

wherein the second overlay edge device is configured to:

receive the second data packet from the multicast replication point device via the second VXLAN tunnel;

wherein the third overlay edge device is configured to:

receive the third data packet from the multicast replication point device via the third VXLAN tunnel.

10. The system of claim 9, wherein the multicast replication point device is further configured to:

obtain a membership information, wherein the membership information comprises relationship between a virtual network ID and information of an overlay edge node.

11. The system of claim 10, wherein the information of the overlay edge node comprises an address of the overlay edge node, or an identifier of the overlay edge node.

12. The system of claim 9, wherein the multicast data packet is encapsulated by a VXLAN header, wherein the VXLAN header comprises the virtual network ID.

13. The system of claim 9, wherein the multicast replication point device is implemented as an aggregation switch, or a core switch, a router, or a chip.

14. The system of claim 9, wherein the multicast replication point device is deployed in a data center (DC).

15. The system of claim 9, wherein the first overlay edge node is implemented as a physical switch, a virtual switch, a hypervisor, a server, or a chip.

16. The system of claim 9, wherein the second overlay edge node is configured to:

decapsulate the second data packet to obtain the multicast data packet;

multicast the multicast data packet to at least one receiver attached to the second overlay edge node.

* * * * *